United States Patent
Kim et al.

(10) Patent No.: US 11,729,302 B2
(45) Date of Patent: Aug. 15, 2023

(54) BATTERY HAVING ELECTRODE TABS AND ELECTRONIC DEVICE HAVING SAME

(71) Applicant: Samsung Electronics Co., Ltd., Gyeonggi-do (KR)

(72) Inventors: Dohoon Kim, Gyeonggi-do (KR); Chulwoo Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 15/734,612

(22) PCT Filed: May 14, 2019

(86) PCT No.: PCT/KR2019/005543
§ 371 (c)(1),
(2) Date: Dec. 3, 2020

(87) PCT Pub. No.: WO2019/235749
PCT Pub. Date: Dec. 12, 2019

(65) Prior Publication Data
US 2021/0160357 A1 May 27, 2021

(30) Foreign Application Priority Data

Jun. 7, 2018 (KR) .......................... 10-2018-0065381

(51) Int. Cl.
*H04M 1/02* (2006.01)
*H01M 50/519* (2021.01)
(Continued)

(52) U.S. Cl.
CPC ....... *H04M 1/0262* (2013.01); *H01M 50/519* (2021.01); *H01M 50/538* (2021.01);
(Continued)

(58) Field of Classification Search
None
See application file for complete search history.

(56) References Cited

U.S. PATENT DOCUMENTS

| 8,142,928 B2 | 3/2012 | Blomgren et al. |
| 8,491,673 B2 | 7/2013 | Daidoji et al. |
(Continued)

FOREIGN PATENT DOCUMENTS

| JP | 4265014 B2 | 5/2009 |
| JP | 2013-187077 A | 9/2013 |
(Continued)

OTHER PUBLICATIONS

Wei Zhao et al.; "Effect of tab design on large-format Li-ion cell performancee"; Journal of Power Sources (2014); pp. 70-79; www.elsevier.com/locate/jpowsour.
(Continued)

*Primary Examiner* — Quoc D Tran
(74) *Attorney, Agent, or Firm* — Cha & Reiter, LLC

(57) ABSTRACT

According to various embodiments of the present invention, an electronic device may comprise: a housing, which comprises a first plate, a second plate facing the opposite direction to the first plate, and a side surface member surrounding a space between the first plate and the second plate; a display viewed through at least a part of the first plate; a battery, which is disposed in the housing and comprises a battery cell comprising multiple cell parts, at least some of which are arranged to overlap each other when viewed from above one surface of the battery, and multiple conductive members arranged so as to overlap each other at the edges of the multiple cell parts when viewed from above the one surface; a battery protection circuit joined to the multiple conductive members; and a processor operationally
(Continued)

connected to the display and the battery. Various other embodiments may also be possible.

15 Claims, 24 Drawing Sheets

(51) Int. Cl.
    *H01M 50/538*     (2021.01)
    *H01M 50/574*     (2021.01)
    *H01M 50/534*     (2021.01)

(52) U.S. Cl.
    CPC ....... *H01M 50/574* (2021.01); *H04M 1/0266* (2013.01); *H04M 1/0277* (2013.01); *H01M 50/534* (2021.01); *H01M 2220/30* (2013.01)

(56) References Cited

U.S. PATENT DOCUMENTS

| | | | |
|---|---|---|---|
| 8,741,471 | B2 | 6/2014 | Park et al. |
| 10,468,746 | B2 | 11/2019 | Lee et al. |
| 10,818,957 | B2* | 10/2020 | Lee .................. H01M 10/0436 |
| 10,879,518 | B1* | 12/2020 | Holmdahl ......... H01M 10/0431 |
| 11,239,522 | B2* | 2/2022 | Suzuki ................ H01M 50/503 |
| 2010/0190056 | A1 | 7/2010 | Turner et al. |
| 2011/0274964 | A1* | 11/2011 | Tuffile ................ H01M 50/543 |
| | | | 429/179 |
| 2012/0231300 | A1 | 9/2012 | Park et al. |
| 2018/0097275 | A1 | 4/2018 | Lee et al. |
| 2018/0191034 | A1* | 7/2018 | Zeng .................. H01M 50/124 |
| 2018/0254467 | A1* | 9/2018 | Jeong ................ H01M 50/148 |
| 2019/0036148 | A1* | 1/2019 | Kim .................... H01M 50/543 |

FOREIGN PATENT DOCUMENTS

| | | |
|---|---|---|
| JP | 6171980 B2 | 8/2017 |
| KR | 10-2013-0023033 A | 3/2013 |
| KR | 10-2018-0037786 A | 4/2018 |
| KR | 10-2018-0054038 A | 5/2018 |

OTHER PUBLICATIONS

Guangsheng Zhang et al.; "Effects of Non-Uniform Current Distribution on Energy Density of Li-Ion Cells"; Journal of the Electrochemical Society(2013); A2299-A2305.

Korean Office Action dated May 17, 2023.

* cited by examiner

BATTERY HAVING ELECTRODE TABS AND ELECTRONIC DEVICE HAVING SAME

CROSS REFERENCE TO RELATED APPLICATIONS

This application is a National Phase Entry of PCT International Application No. PCT/KR2019/005543, which was filed on May 14, 2019, and claims a priority to Korean Patent Application No. 10-2018-0065381, which was filed on Jun. 7, 2018, the contents of which are incorporated herein by reference.

TECHNICAL FIELD

Various embodiments of the disclosure relate to arrangement of electrode tabs of a battery of an electronic device.

BACKGROUND ART

A secondary battery of an electronic device may include, according to the shape of the battery case thereof, a cylindrical battery having an electrode assembly contained in a cylindrical metal can, an angled battery having an electrode assembly contained in an angled metal can, or a pouch-type battery having an electrode assembly contained in a pouch-type case made of an aluminum laminate sheet.

In addition, battery electrode assemblies may include a jelly-roll type and a stacked type. A jelly-roll type electrode assembly may be manufactured by coating a metal foil used as a collector with an electrode active material or the like, fabricating electrodes through pressing and slitting processes, spacing positive and negative electrodes apart from each other by using a separator, and winding the same helically.

A stacked-type electrode assembly is manufactured by spacing multiple positive and negative electrodes from each other by using separators and successively laminating the same, and is applicable both to an angled battery and to a pouch-type battery. In addition, it is also possible to use an electrode assembly that is a hybrid of the jelly-rolling type and stack-type.

DISCLOSURE OF INVENTION

Technical Problem

Electronic devices employ battery-integrated large-capacity pouch-type batteries, instead of exchangeable batteries, for the sake of compactness and slimness. In the case of a large-capacity pouch-type cattery, the battery performance may vary according to the manner in which tabs are configured. Therefore, in order to utilize the battery performance to the largest extent, the configuration of tabs connected to positive and negative electrodes may be one of important factors.

According to various embodiments of the disclosure, an electronic device may include a battery cell having an efficient multi-tab configuration such that the maximum battery performance can be utilized, and an increase in the thickness of the multi-tab can be decreased.

According to various embodiments of the disclosure, an electronic device may have tabs disposed in multiple positions in connection with a single cell such that, when electric power is used, a uniform chemical reaction occurs in the cell, thereby improving the battery stability while minimizing a thickness increase.

Solution to Problem

An electronic device according to various embodiments of the disclosure may include: a housing including a first plate, a second plate facing an opposite side to the first plate, and a side member surrounding a space between the first plate and the second plate, and connected to the second plate or integrally formed with the second plate; a display viewed through at least a portion of the first plate; a battery disposed in the housing, the battery including a battery cell including a plurality of cell parts disposed such that at least portions of the plurality of cell parts overlap each other when viewed from the top of one surface of the battery, and a plurality of conductive members disposed such that the plurality of conductive members do not overlap each other at peripheries of the plurality of cell parts when viewed from the top of one surface of the battery; a battery protection circuit joined to the plurality of conductive members; and a processor operatively connected to the display and the battery.

An electronic device according to various embodiments of the disclosure may include: a housing including a first plate, a second plate facing an opposite side of the first plate, and a side member surrounding a space between the first plate and the second plate, and connected to the second plate or integrally formed with the second plate; a display disposed in the space and visually exposed through at least a portion of the first plate; and a battery disposed in the space to be parallel to the first plate, the battery including a battery cell including a plurality of cell parts disposed such that at least portions of the plurality of cell parts overlap each other when the first plate is viewed from the top, and a plurality of electrode tabs protruding to the outside from at least two cell parts, among the plurality of cell parts, wherein one or more electrode tabs, among the plurality of electrode tabs protruding from the at least two cell parts, may be disposed to be at least partially parallel to each other when the first plate is viewed from the top.

Advantageous Effects of Invention

A battery according to the disclosure uses multiple tabs so as to improve the current uniformity inside the battery cell and to reduce the current movement path, thereby reducing the resistance, such that the maximum battery performance can be utilized, and an increase in the thickness of the multi-tab can be minimized.

BEST MODE FOR CARRYING OUT THE INVENTION

Figure 1:
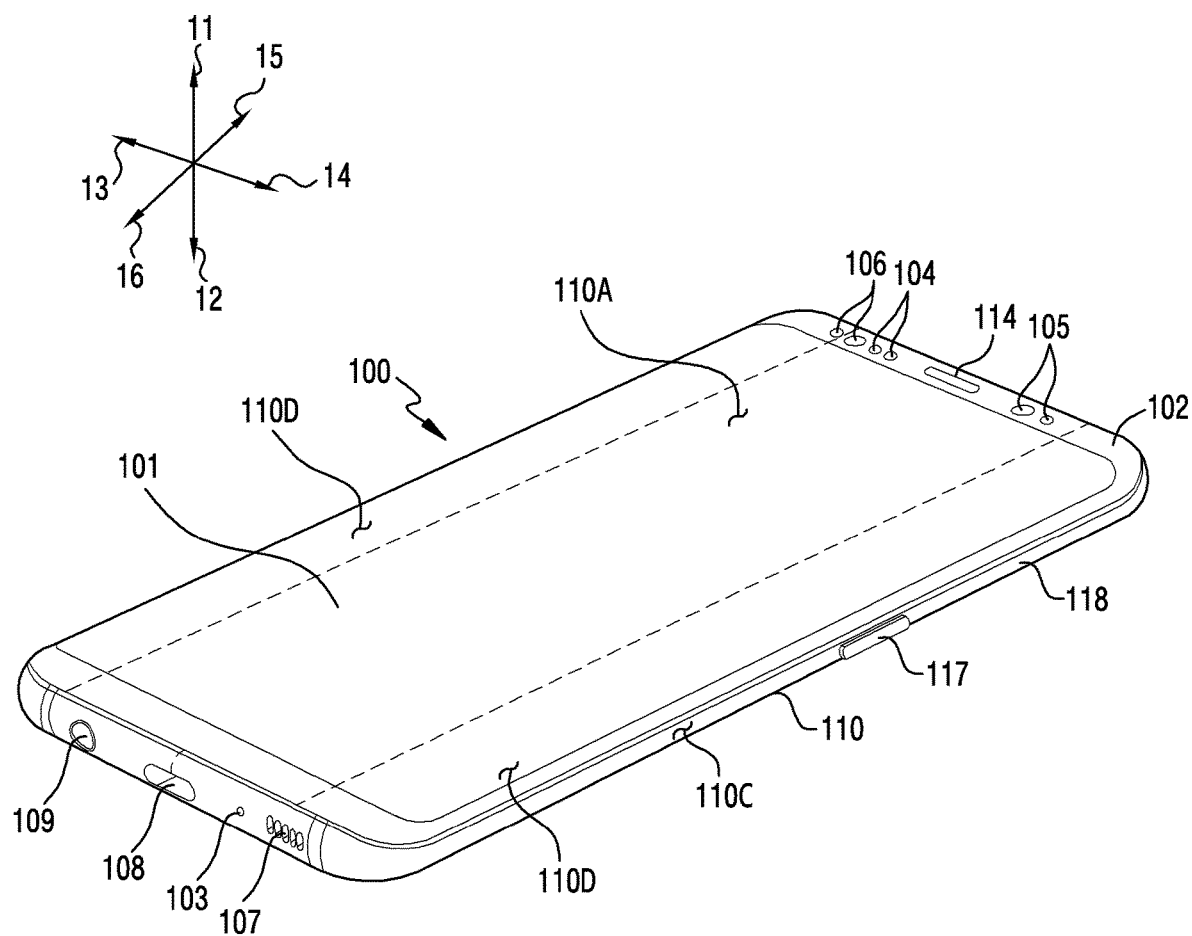
FIG. 1 is a perspective view illustrating a front surface of a mobile electronic device according to an embodiment.

Hereinafter, various embodiments of the disclosure will be described with reference to the accompanying drawings. However, it should be appreciated that these are not intended to limit the disclosure to particular embodiments and the disclosure includes various changes, equivalents, and/or alternatives for the embodiments of the disclosure. With regard to the description of the drawings, similar reference numerals may be used to designate similar or relevant elements.

An electronic device according to various embodiments of the disclosure may, for example, include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device (e.g., smart glasses, head-mounted device (HMD)), electronic clothing, electronic bracelet, electronic necklace, electronic accessory (appcessory), electronic tattoo, smart mirror, or smart watch).

FIG. 1 is a perspective view illustrating a front surface of a mobile electronic device according to an embodiment.

Figure 2:
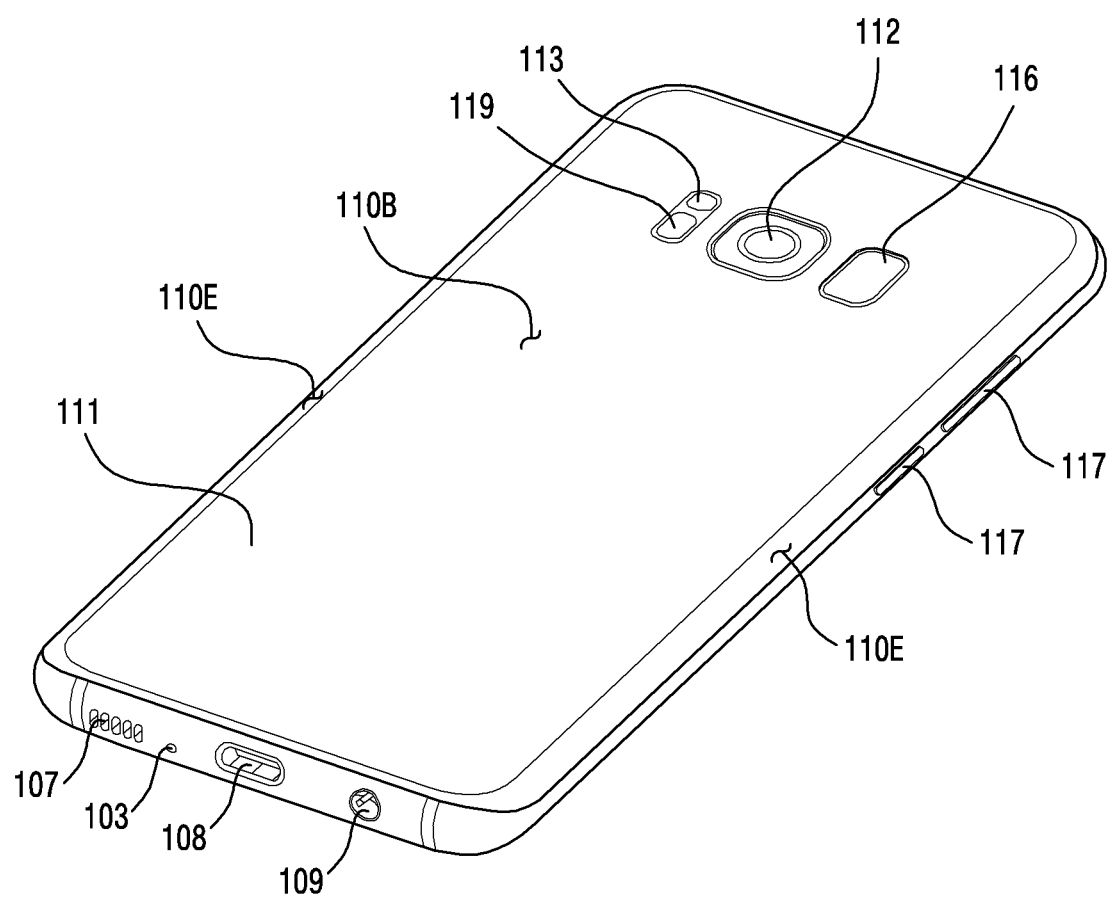
FIG. 2 is a perspective view illustrating a rear surface of the mobile electronic device according to an embodiment.

FIG. 2 is a perspective view illustrating a rear surface of the mobile electronic device according to an embodiment.

Referring to FIGS. 1 and 2, an electronic device 100 according to an embodiment may include a housing 110 including a first surface (or a front surface) 110A, a second surface (or a rear surface) 110B, and a side surface 110C surrounding a space between the first surface 110A and the second surface 110B. In another embodiment (not illustrated), the housing may refer to a structure that defines some of the first surface 110A, the second surface 110B, and the side surface 110C of FIG. 1. According to an embodiment, the first surface 110A may be defined by a front plate 102 (e.g., a glass plate or a polymer plate including various coating layers), at least a portion of which is substantially transparent. The second surface 110B may be defined by a substantially opaque rear plate 111. The rear plate 111, for example, may be formed of coated or colored glass, ceramics, a polymer, a metal (e.g., aluminum, stainless steel (STS), or magnesium), or a combination of at least two thereof. The side surface 110C may be coupled to the front plate 102 and the rear plate 111, and may be defined by a side bezel structure (or 'a side member') 118 including a metal and/or a polymer. In some embodiments, the rear plate 111 and the side bezel structure 118 may be integrally formed and may include the same material (e.g., a metallic material such as aluminum).

In the illustrated embodiment, the front plate 102 may include two first areas 110D that are deflected from the first surface 110A toward the rear plate 111 and extend seamlessly, at opposite ends of a long edge of the front plate 102. In the illustrated embodiment (see FIG. 2), the rear plate 111 may include two second areas 110E that are deflected from the second surface 110B toward the front plate 102 and extend seamlessly, at opposite ends of a long edge of the rear plate 111. In some embodiments, the front plate 102 (or the rear plate 111) may include only one of the first areas 110D (or the second areas 110E). In other embodiments, some of the first areas 110D or the second areas 110E may not be included. In the embodiments, when viewed from a side of the electronic device 100, the side bezel structure 118 may have a first thickness (width) on a side surface, on which neither the first areas 110D nor the second areas 110E are included, and may have a second thickness that is smaller than the first thickness on a side surface, on which the first areas 110D or the second areas 110E are included.

According to an embodiment, the electronic device 100 may include at least one of a display 101, audio modules 103, 107, 114, sensor modules 104, 116, and 119, camera modules 105, 112, and 113, a key input device 117, a light emitting element 106, and connector holes 108 and 109. In some embodiments, at least one (e.g., the key input device 117 or the light emitting element 106) of the elements may be omitted from the electronic device 100 or another component may be additionally included in the electronic device 100.

The display 101, for example, may be visually exposed through a corresponding portion of the front plate 101. In some embodiments, at least a portion of the display 101 may be exposed through the front plate 102 defining the first surface 110A, and the first areas 110D of the side surface 110C. In some embodiments, corners of the display 101 may have a shape that is substantially the same as the adjacent outer shape of the front plate 102. In other embodiments (not illustrated), in order to expand the area, by which the display 101 is exposed, the intervals between the outskirts of the display 101 and the outskirts of the front plate 102 may be substantially the same.

In other embodiments (not illustrated), a portion of the screen display area of the display 101 may have a recess or an opening, and may include at least one of the audio module 114, the sensor module 104, the camera module 105, and the light emitting element 106, which are aligned with the recess or the opening. In other embodiments (not illustrated), at least one of the audio module 114, the sensor module 104, the camera module 105, the fingerprint sensor 116, and the light emitting element 106 may be included on the rear surface of the screen display area of the display 101. In other embodiments (not illustrated), the display 101 may be coupled to or be disposed to be adjacent to a touch detection circuit, a pressure sensor that may measure the strength (the pressure) of a touch, and/or a digitizer that detects a stylus pen of a magnetic field type. In some embodiments, at least a portion of the sensor modules 104 and 119 and/or at least a portion of the key input device 117 may be disposed in the first areas 110D and/or the second areas 110E.

The audio modules 103, 107, 114 may include a microphone hole 103 and speaker holes 107 and 114. A microphone for acquiring external sounds may be disposed in the microphone hole 103, and in some embodiments, a plurality of microphones may be disposed to detect the direction of a sound. The speaker holes 107 and 114 may include an external speaker hole 107 and a communication receiver hole 114. In some embodiments, the speaker hole 107 and 114 and the microphone hole 103 may be realized by one hole or a speaker may be included while a speaker hole 107 and 114 is not employed (e.g., a piezoelectric speaker).

The sensor modules 104, 116, and 119 may generate an electrical signal or a data value corresponding to an operational state of the interior of the electronic device 100 or an environmental state of the outside. The sensor modules 104, 116, and 119, for example, may include a first sensor module 104 (e.g., a proximity sensor) and a second sensor module (not illustrated) (e.g., a fingerprint sensor) disposed on the first surface 110A of the housing 110, and/or a third sensor module 119 (e.g., a HRM sensor) and/or a fourth sensor module 116 (e.g., a fingerprint sensor) disposed on the second surface 110B of the housing 110. The fingerprint sensor may be disposed not only on the first surface 110A (e.g., the display 101) but also on the second surface 110B of the housing 110. The electronic device 100 may further include a sensor module (not illustrated), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illumination sensor 104.

The camera modules 105, 112, and 113 may include a first camera device 105 disposed on the first surface 110A of the electronic device 100, and a second camera device 112 and/or a flash 113 disposed on the second surface 110B. The camera devices 105 and 112 may include one or a plurality of lenses, an image sensor, and/or an image signal processor. The flash 113, for example, may include a light emitting diode or a xenon lamp. In some embodiments, two or more lenses (an infrared ray camera or a wide angle/telephoto lens), and image sensors may be disposed on one surface of the electronic device 100.

The key input device 117 may be disposed on the side surface 110C of the housing 110. In another embodiment, the electronic device 100 may not include some or all of the above-mentioned key input devices 117 and the key input devices 117 which are not included, may be realized in different forms, such as a soft key, on the display 101. In some embodiments, the key input device may include a sensor module 116 disposed on the second surface 110B of the housing 110.

The light emitting element 106, for example, may be disposed on the first surface 110A of the housing 110. The light emitting element 106, for example, may provide state information on the electronic device 100 in the form of light. In other embodiments, the light emitting element 106, for example, may provide a light source that interworks with an operation of the camera module 105. The light emitting element 106, for example, may include an LED, an IR LED, and a xenon lamp.

The collector holes 108 and 109 may include a first connector hole 108 that may accommodate a connector (e.g., a USB connector) for transmitting and receiving electric power and/or data to and from an external electronic device and/or a second connector hole (e.g., an earphone jack) 109 that may accommodate a connector for transmitting and receiving an audio signal to and from the external device.

Figure 3:
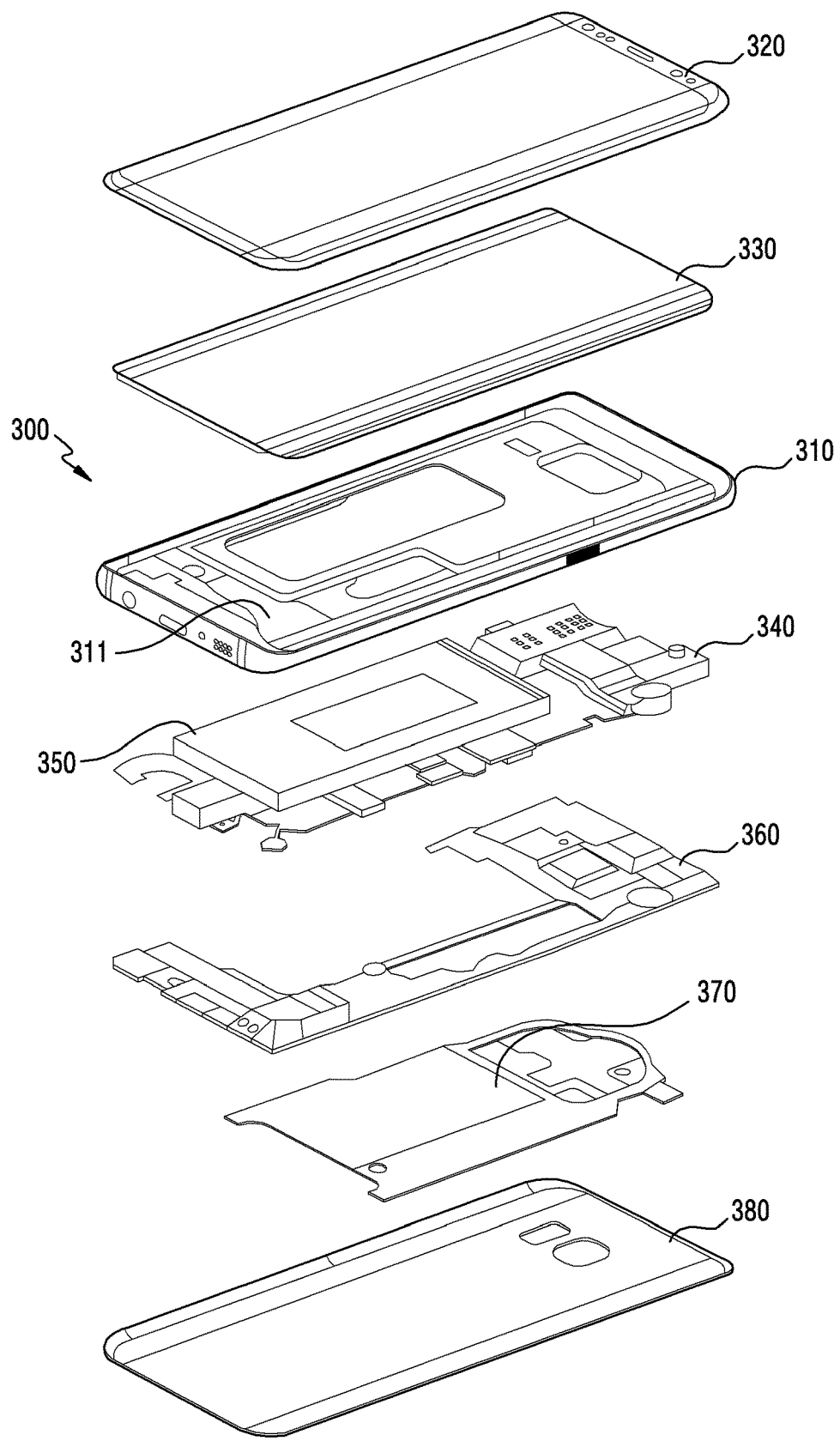
FIG. 3 is an exploded perspective view schematically illustrating an internal configuration of the mobile electronic device according to an embodiment.

FIG. 3 is an exploded perspective view schematically illustrating an internal configuration of the mobile electronic device according to an embodiment.

Referring to FIG. 3, an electronic device 300 may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, at least one (e.g., the first support member 311 or the second support member 360) of the elements may be omitted from the electronic device 300 or another component may be additionally included in the electronic device 300. At least one of the components of the electronic device 300 may be the same as or similar to at least one of the components of the electronic device 100 of FIGS. 1 and 2, and a repeated description thereof will be omitted.

The first support member 311 may be disposed in the interior of the electronic device 300 to be connected to the side bezel structure 310 or to be integrally formed with the side bezel structure 310. The first support member 311, for example, may be formed of a metallic material and/or a nonmetallic material (e.g., a polymer). The display 330 may be coupled to one surface of the first support member 311, and the printed circuit board 340 may be coupled to an opposite surface of the first support member 311. A processor, a memory, and/or an interface may be mounted on the printed circuit board 340. The processor, for example, may include one or more of a central processing unit, an application processor, a graphic processing unit, an image signal processor, a sensor hub processor, or a communication processor.

The memory, for example, may include a volatile and/or nonvolatile memory.

The interface, for example, may include a high definition multimedia interface (HDMI), a universal serial bus (USB) interface, an SD card interface, and/or an audio interface. The interface, for example, may electrically or physically connect the electronic device 300 to an external electronic device, and may include a USB connector, an SD card/MMC connector, and an audio connector.

The battery 350 is a device for supplying electric power to at least one component of the electronic device 300, and for example, may include a primary battery that cannot be recharged, a secondary battery that may be recharged, or a fuel cell. At least a portion of the battery 350, for example, may be disposed on substantially the same plane as the printed circuit board 340. The battery 350 may be integrally disposed in the interior of the electronic device 300, and may be disposed to be detachable from the electronic device 300.

The antenna 370 may be disposed between the rear plate 380 and the battery 350. The antenna 370, for example, may include a near field communication (NFC) antenna, a wireless charging antenna, and/or a magnetic secure transmission (MST) antenna. The antenna 370, for example, may perform short-range communication with an external device, or may wirelessly transmit and receive electric power that is necessary for charging. In another embodiment, an antenna structure may be defined by some of the side bezel structure 310 and/or the first support member 311, or a combination thereof.

Figure 4A:
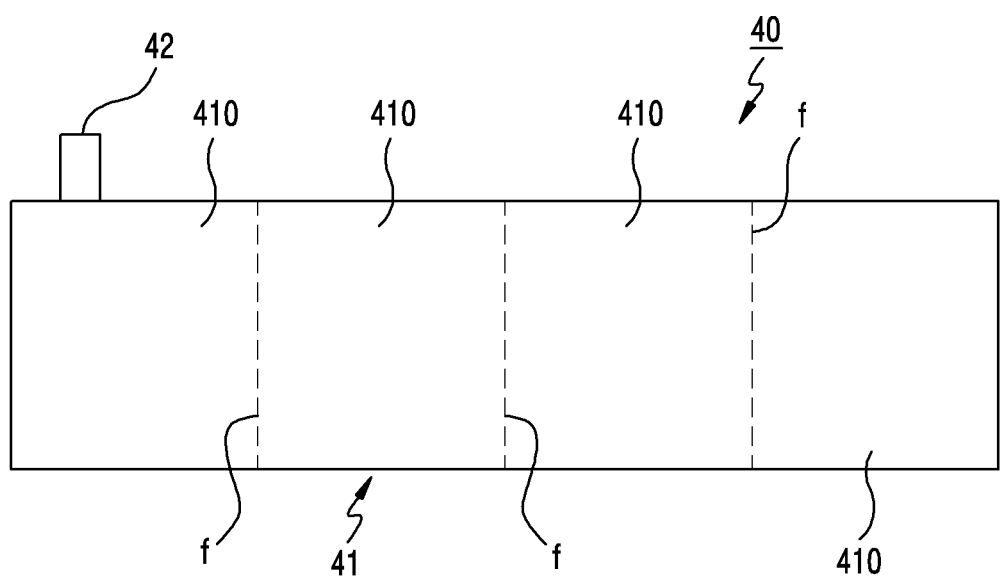
FIG. 4A is a plan view illustrating an electrode plate and an electrode tab of a pouch type battery cell in a state before rolling according to an embodiment.

FIG. 4A is a plan view illustrating an electrode plate and an electrode tab of a pouch type battery cell in a state before rolling according to an embodiment.

Figure 4B:
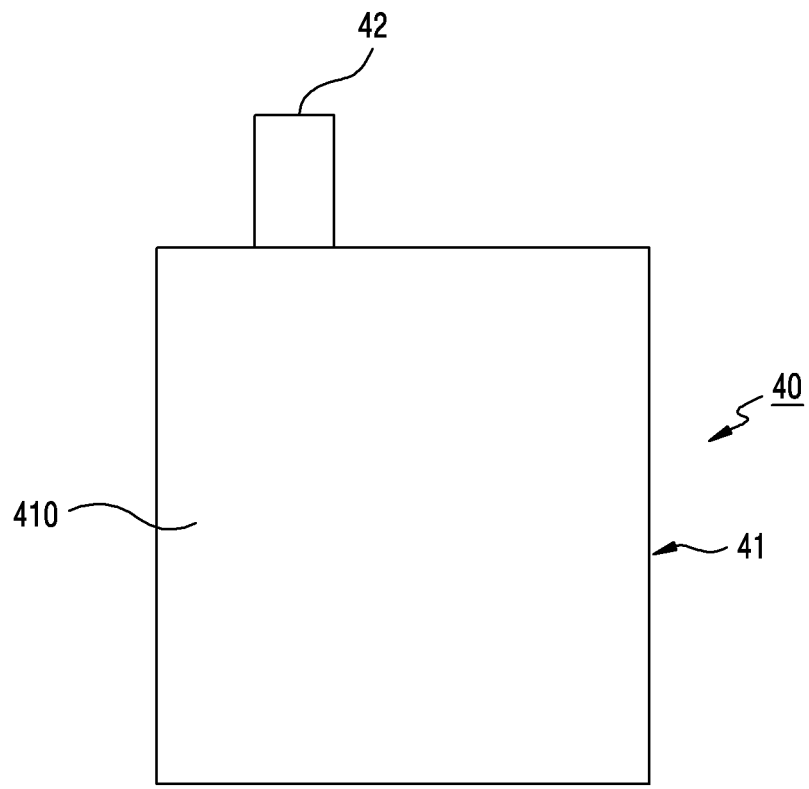
FIG. 4B is a plan view illustrating the electrode plate and the electrode tab of the pouch type battery cell in a state of rolling according to an embodiment.

FIG. 4B is a plan view illustrating the electrode plate and the electrode tab of the pouch type battery cell in a state of rolling according to an embodiment.

Referring to FIGS. 4A and 4B, a conventional pouch type battery cell 40 may include a battery cell electrode plate 41 and a single tab 42.

For example, the pouch type battery cell 40 may be a lithium ion battery. The lithium ion battery may include five constituent elements. The five constituent elements may include a positive electrode (including a tab, a positive electrode substrate, and a positive electrode active material), a negative electrode (including a tab, a negative electrode substrate, and a negative electrode active material), a case (a pouch or a container or the like), a separator, and an electrolyte.

The positive electrode may mainly employ a lithium cobalt oxide ($LiCoO_2$) as an active material, and an aluminum (Al) substrate as a positive electrode substrate. The negative electrode may employ graphite (C) as an active material, and copper (Cu) as a negative electrode substrate. The separator may function to provide a passage, through which lithium (Li) ions flow, between the positive electrode and the negative electrode, and insulate the positive electrode and the negative electrode as well. Currents of the lithium ion battery may flow through the tabs.

The battery cell electrode plate 41 of the battery cell 40 having the above-described configuration may be folded along dotted lines f one or more times, and the folded cell parts 401 may be wound in a roll type to be disposed to overlap each other. For example, the folded cell parts 410 may have a rectangular shape and the like. The dotted lines f may be folding lines. According to various embodiments, the single tab 42 may be connected to the battery cell electrode plate 41 to apply a current to the battery dell electrode plate 41.

However, because the current transfer path of the conventional pouch type battery cell becomes longer as it is located farther from the single tab due to the mounting structure of the single tab, a chemical reaction in the battery cell is not uniform and thus the energy distribution in the battery cell is not uniform so that stability may problematic and there may be a limit in maximizing the performance of the battery.

Hereinafter, a configuration of the pouch type battery cell according to various embodiments of the disclosure will be described with reference to the accompanying drawings.

Figure 5A:
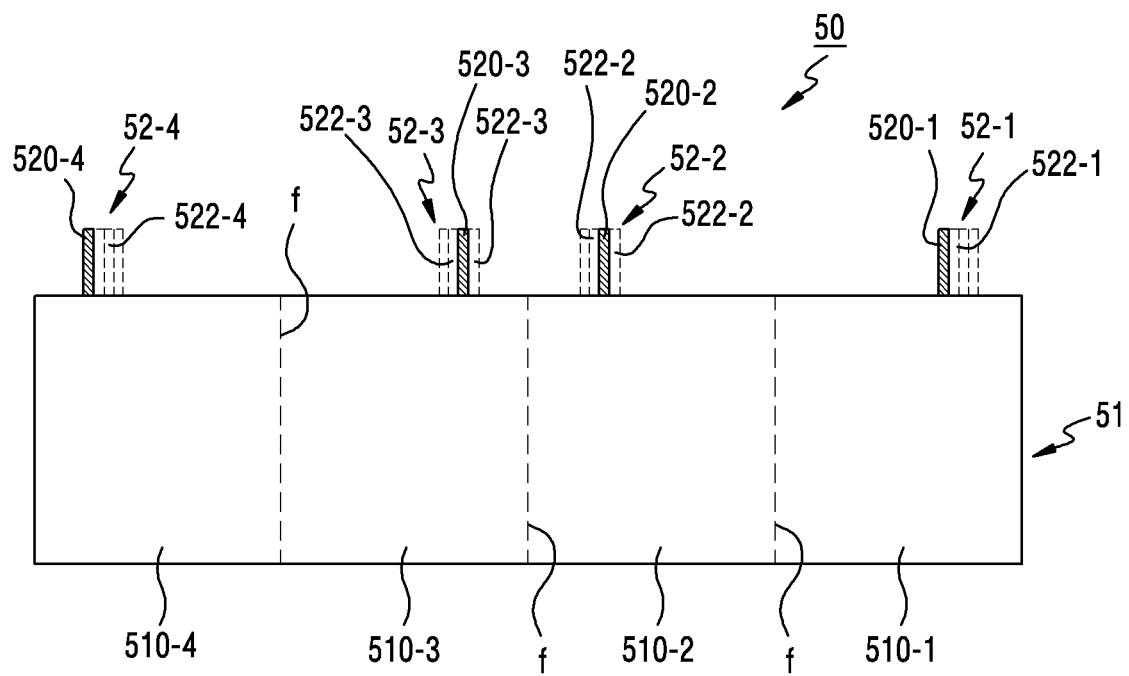
FIG. 5A is a plan view illustrating an electrode plate and electrode tabs of a pouch type battery cell in a state before rolling according to various embodiments of the disclosure.

FIG. 5A is a plan view illustrating a battery cell electrode plate and multi-tabs of a pouch type battery cell in a state before rolling according to an embodiment.

Referring to FIG. 5A, a pouch type battery cell 50 (e.g., the battery 350 of FIG. 3) according to various embodiments may have a close correlation with a current uniformity and a cell interior resistance according to the location of battery tabs 52. The pouch type battery cell 50 according to various embodiments may include a battery cell electrode plate 51 or first to fourth electrode tabs 52-1 to 52-4. For example, the pouch type battery cell 50 may be a lithium ion battery.

The battery cell electrode plate 51 of the lithium ion battery according to various embodiments may include first to fourth cell parts 510-1 to 510-4 formed by folding the battery cell electrode plate 51 along dotted lines f one or more times. For example, the first to fourth cell parts 510-1 to 510-4 may be disposed to overlap each other. For example, the first to fourth cell parts 510-1 to 510-4 may have a polygonal shape, for example, a rectangular shape. The dotted lines f of the first to fourth cell parts 510-1 to 510-4 may be folding lines. FIG. 5A illustrates four cell parts 510-1 to 510-4, but three or less or five or less cell parts 510-1 to 510-4 may be disposed.

The first to fourth electrode tabs 52-1 to 52-4 according to various embodiments may be mounted on the battery cell electrode plate 51 whereby a current may be applied to the battery cell electrode plate 51. According to an embodiment, at least one of the first to fourth electrode tabs 52-1 to 52-4 may be disposed in the first to fourth cell parts 510-1 to 510-4.

Because the current transfer path of the pouch type battery 50 according to the configuration becomes shorter as currents flow to the first to fourth electrode tabs 52-1 to 52-4, respectively, the resistance of the battery cell can become lower and the performance and the lifetime of the battery can be increased.

According to various embodiments, the first to fourth electrode tabs 52-1 to 52-4 may protrude from peripheries of the first to fourth cell parts 510-1 to 510-4.

According to various embodiments, the first to fourth electrode tabs 52-1 to 52-4 may include first to fourth conductive parts 520-1 to 520-4 and first to fourth nonconductive parts 522-1 to 522-4. According to an embodiment, the first to fourth nonconductive parts 522-1 to 522-4 may be omitted. The shapes of the first to fourth electrode tabs 52-1 to 52-4 may be different. For example, the lengths, the thicknesses, or the widths of the first to fourth electrode tabs 52-1 to 52-4 may be different.

The battery cell electrode plate 51 according to various embodiments may be a positive electrode plate or a negative electrode plate. For example, when the battery cell electrode plate 51 is a positive electrode plate, the first to fourth cell parts 510-1 to 510-4 may be positive cell parts and the first to fourth electrode tabs 52-1 to 52-4 may be positive electrode tabs. For example, when the battery cell electrode plate 51 is a negative electrode plate, the first to fourth cell parts 510-1 to 510-4 may be negative cell parts and the first to fourth electrode tabs 52-1 to 52-4 may be negative electrode tabs.

According to various embodiments, in the pouch type battery cell 50, the first to fourth electrode tabs 52-1 to 52-4 are not limited to those provided in the first to fourth cell parts 510-1 to 510-4, respectively. For example, the first electrode tab 52-1 may be disposed in the first cell part 510-1, the second electrode tab 52-2 may be disposed in the second cell part 510-2, the third electrode tab 52-3 may be disposed in the third cell part 510-3, and the fourth electrode tab 52-4 may not be disposed in the fourth cell part 510-4.

According to various embodiments, the first to fourth electrode tabs 52-1 to 52-4 may be attached to portions of the first to fourth cell parts 510-1 to 510-4 by using an insulation tape (not illustrated).

The first to fourth electrode tabs 52-1 to 52-4 may be mounted on the first to fourth cell parts 510-1 to 510-4, and the mounting locations of the first to fourth electrode tabs 52-1 to 52-4 may be different. The mounting locations of the first to fourth electrode tabs 52-1 to 52-4 will be described below with reference to FIG. 5B.

Figure 5B:
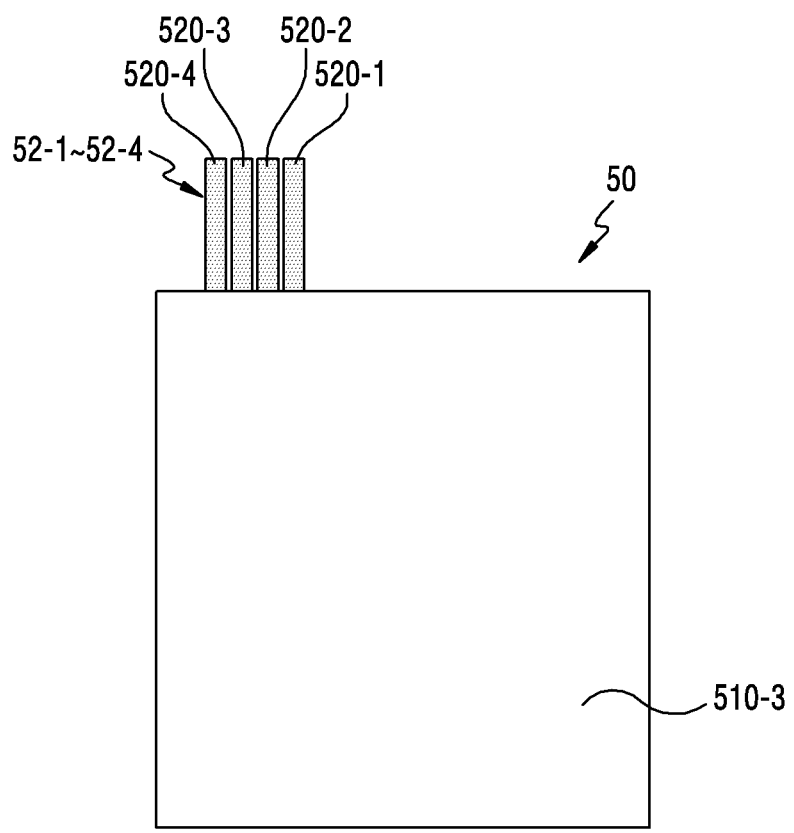
FIG. 5B is a plan view illustrating the electrode plate and the electrode tabs of the pouch type battery cell in a state of rolling according to various embodiments of the disclosure.

FIG. 5B is a plan view illustrating the electrode plate and the electrode tabs of the pouch type battery cell in a folded state according to an embodiment of the disclosure.

Referring to FIG. 5B, in the pouch type battery 50, in which the cell parts are folded, according to various embodiments, when viewed from the top of one surface of the first cell part 510-3 disposed on the uppermost side, the first to fourth conductive parts 520-1 to 520-4 of the first to fourth electrode tabs 52-1 to 52-4 may be disposed not to overlap each other. At least portions of the first plate (e.g., the plurality of cell parts (e.g., the cell parts 510-1 to 510-4 of FIG. 5A)) of the electronic device may be disposed to overlap each other when viewed from the top of FIG. 1. Further, among the plurality of cell parts (e.g., the cell parts 510-1 to 510-4 of FIG. 5A), at least two cell parts may include one or more electrode tabs (e.g., the first to fourth electrode tabs 52-1 to 52-4 of FIG. 5A) protruding to the outside. The one or more electrode tabs (e.g., the first to fourth electrode tabs 52-1 to 52-4 of FIG. 5A) protruding from the two or more cell parts (e.g., the cell parts 510-1 to 510-4) when viewed from the top of the first plate may be disposed to be at least partially parallel to each other. For example, the one or more electrode tabs (e.g., the first to fourth electrode tabs 52-1 to 52-4 of FIG. 5A) may be disposed to be parallel to each other while not overlapping each other.

As compared with the thickness of the pouch type battery cell tab (e.g., the thickness of the single tab 42) illustrated in FIGS. 4A and 4B, the thickness of the pouch type battery cell tab (e.g., the first to fourth electrode tabs 52-1 to 52-4) illustrated in FIG. 5B may not be increased.

Figure 6A:
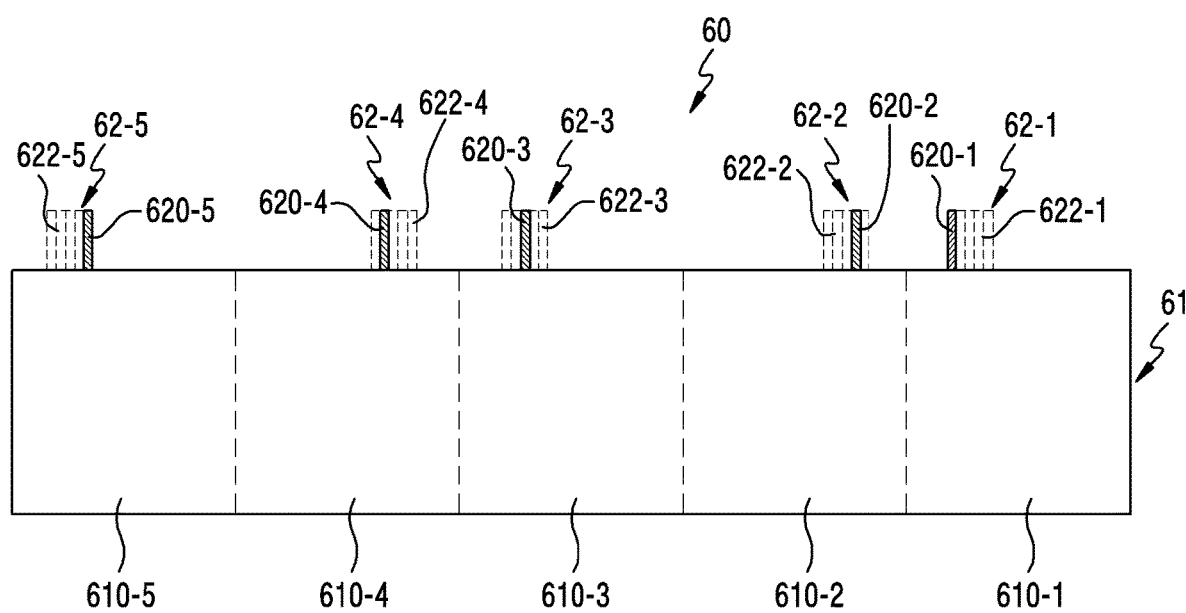
FIG. 6A is a plan view illustrating an electrode plate and electrode tabs of a pouch type battery cell in a state before rolling according to various embodiments of the disclosure.

FIG. 6A is a plan view illustrating an electrode plate and electrode tabs of a pouch type battery cell in a state before folding according to various embodiments of the disclosure;

Referring to FIG. 6A, as compared with the pouch type battery cell 50 (the four cell parts 510-1 to 510-4 and the four electrode tabs 52-1 to 52-4 provided in the cell parts) illustrated in FIG. 5A, a pouch type battery cell 60 according to various embodiments may include five cell parts 610-1 to 610-5, and electrode tabs 62-1 to 62-5 included in the cell parts 610-1 to 610-5.

The pouch type battery cell 60 (e.g., the battery cell 50 of FIG. 5A) according to various embodiments may include a battery cell electrode plate 61 (e.g., the battery cell electrode plate 51 of FIG. 5A), and first to fifth electrode tabs 62-1 to 62-5 (e.g., the first to fourth electrode tabs 52-1 to 52-4 of FIG. 5A). For example, the pouch type battery 60 may be a lithium ion battery.

The battery cell electrode plate 61 of the lithium ion battery according to various embodiments may include first to fifth cell parts 610-1 to 610-5 formed by folding the battery cell electrode plate 51 along dotted lines f one or more times. For example, the first to fifth cell parts 610-1 to 610-5 (e.g., the first to fourth cell parts 510-1 to 510-4 of FIG. 5A) may be disposed to overlap each other. For example, the first to fifth cell parts 610-1 to 610-5 may have a polygonal shape, for example, a rectangular shape. The dotted lines f of the first to fifth cell parts 610 may be folding lines.

The first to fifth electrode tabs 62-1 to 62-5 according to various embodiments may be mounted on the battery cell electrode plate 61 whereby a current may be applied to the battery cell electrode plate 61. According to an embodiment, at least one of the first to fifth electrode tabs 62-1 to 62-5 may be disposed in the first to fifth cell parts 610-1 to 610-5.

Because the current transfer path of the pouch type battery 60 according to the configuration becomes shorter as currents flow to the first to fifth electrode tabs 62-1 to 62-5, respectively, the resistance of the battery cell can become lower and the performance and the lifetime of the battery can be increased.

According to various embodiments, the first to fifth electrode tabs 62-1 to 62-5 may include first to fifth conductive parts 620-1 to 620-5 (e.g., the first to fourth conductive parts 520-1 to 520-4 of FIG. 5A) or first to fifth nonconductive parts 622-1 to 622-5 (e.g., the first to fourth nonconductive parts 522-1 to 522-4 of FIG. 5A). According to an embodiment, the first to fifth nonconductive parts 622-1 to 622-5 may be omitted. The shapes of the first to fifth electrode tabs 62-1 to 62-5 may be different. For example, the lengths, the thicknesses, and/or the widths of the first to fifth electrode tabs 62-1 to 62-5 may be different.

According to various embodiments, in the pouch type battery cell 60, the first to fifth electrode tabs 62-1 to 62-5 are not limited to those provided in the first to fifth cell parts 610-1 to 610-5, respectively. For example, the first electrode tab 62-1 may be disposed in the first cell part 610-1, the second electrode tab 62-2 may be disposed in the second cell part 610-2, the third electrode tab 62-3 may be disposed in the third cell part 610-3, the fourth electrode tab 62-4 may be disposed in the fourth cell part 610-4, and the fifth electrode tab 62-5 may not be disposed in the fifth cell part 610-5.

The battery cell electrode plate 61 according to various embodiments may be a positive electrode plate or a negative electrode plate.

According to various embodiments, the first to fifth electrode tabs 62-1 to 62-5 may be attached to portions of the first to fifth cell parts 610-1 to 610-5 by using an insulation tape (not illustrated).

The first to fifth electrode tabs 62-1 to 62-5 may be mounted on the first to fifth cell parts 610-1 to 610-5, and the mounting locations of the first to fifth electrode tabs 62-1 to 62-5 may be different. The mounting locations of the first to fifth electrode tabs 62-1 to 62-4 will be described below with reference to FIG. 6B.

Figure 6B:
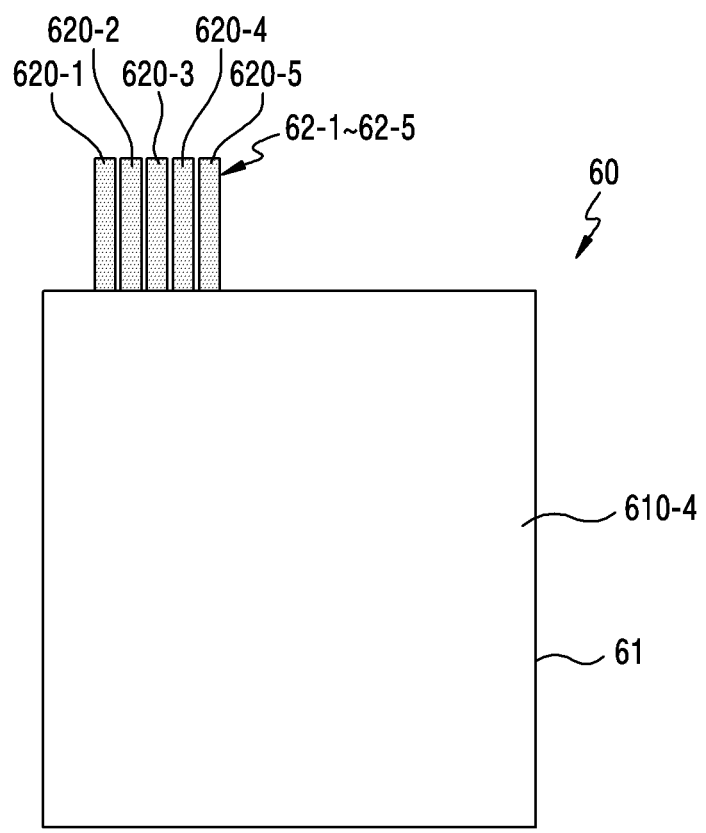
FIG. 6B is a plan view illustrating the electrode plate and the electrode tabs of the pouch type battery cell in a state of rolling according to various embodiment of the disclosure.

FIG. 6B is a plan view illustrating the battery cell electrode plate and the electrode tabs of the pouch type battery cell in a state of rolling according to various embodiment of the disclosure.

Referring to FIG. 6B, in the pouch type battery 60, in which the cell parts are folded, according to various embodiments, when viewed from the vertical top of the fourth cell part 610-4 disposed on the uppermost side, the first to fifth conductive parts 620-1 to 620-5 of the first to fifth electrode tabs 62-1 to 62-5 may be disposed not to overlap each other. As compared with the thickness of the pouch type battery cell tab (e.g., the thickness of the single tab 42) illustrated in FIGS. 4A and 4B, the thickness of the pouch type battery cell tab (e.g., the first to fifth electrode tabs 62-1 to 62-5) illustrated in FIG. 6B may not be increased.

Figure 7A:
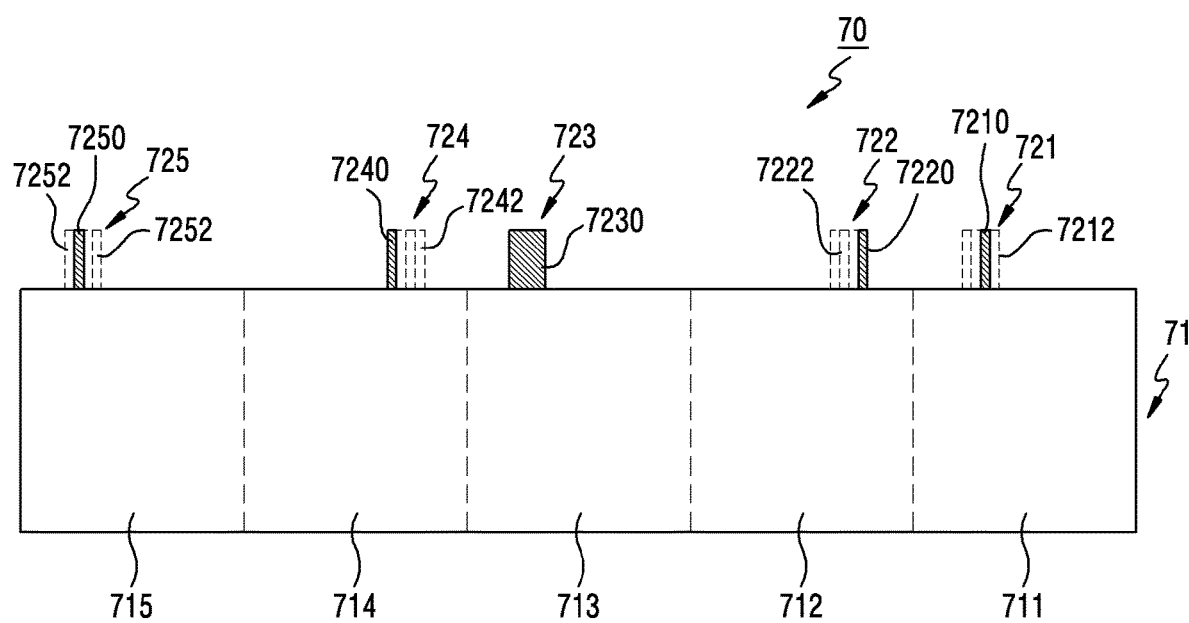
FIG. 7A is a plan view illustrating an electrode plate and electrode tabs of a pouch type battery cell in a state before rolling according to various embodiments of the disclosure.

FIG. 7A is a plan view illustrating a battery cell electrode plate and electrode tabs of a pouch type battery cell in a state before rolling according to an embodiment.

Referring to FIG. 7A, a pouch type battery cell 70 (e.g., the battery cell 50 of FIG. 5A) according to various embodiments may include a battery cell electrode plate 71 and first to fifth electrode tabs 721 to 725 (e.g., the first to fourth electrode tabs 52-1 to 52-4 of FIG. 5A). For example, the pouch type battery 70 may be a lithium ion battery.

The battery cell electrode plate 71 of the lithium ion battery according to various embodiments may include first to fifth cell parts 711 to 715 formed by folding the battery cell electrode plate 51 along dotted lines f one or more times. For example, the folded first to fifth cell parts 711 to 715 (e.g., the first to fourth cell parts 510-1 to 510-4 of FIG. 5A) may be disposed to overlap each other. For example, the folded first to fifth cell parts 711 to 715 may have a polygonal shape, for example, a rectangular shape. The dotted lines f of the first to fifth cell parts 711 to 715 may be folding lines.

The first to fifth electrode tabs 721 to 725 according to various embodiments may be included in the first to fifth cell parts 711 to 715 of the battery cell electrode plate 71, respectively, whereby a current may be applied to the battery cell electrode plate 71. According to an embodiment, at least one of the first to fifth cell parts 711 to 715 may be disposed in the first to fifth electrode tabs 721 to 725.

Because the current transfer path of the pouch type battery according to the configuration becomes shorter as currents flow to the first to fifth electrode tabs 721 to 725, respectively, in the first to fifth cell parts 711 to 715, the resistance of the battery cell can become lower and the performance and the lifetime of the battery can be increased According to various embodiments, the first electrode tab 721 or the second electrode tab 722 may include a first conductive part 7210 (e.g., the first to fourth conductive parts 520-1 to 520-4 of FIG. 5A) or a second conductive part 7220 (e.g., the first to fourth conductive parts 520-1 to 520-4 of FIG. 5A), and a first nonconductive part 7212 (e.g., the first to fourth nonconductive parts 522-1 to 522-4 of FIG. 5A) or a second nonconductive part 7222 (e.g., the first to fourth nonconductive parts 522-1 to 522-4 of FIG. 5A). The first nonconductive parts 7212 or the second nonconductive parts 7222 may be omitted.

According to various embodiments, the fourth electrode tab 724 may include a fourth conductive part 7240 (e.g., the first to fourth conductive parts 520-1 to 520-4 of FIG. 5A) or a fourth nonconductive part 7242 (e.g., the first to fourth nonconductive parts 522-1 to 522-4 of FIG. 5A). According to various embodiments, the fifth electrode tab 725 may include a fifth conductive part 7250 (e.g., the first to fourth conductive parts 520-1 to 520-4 of FIG. 5A) or a fifth nonconductive part 7252 (e.g., the first to fourth nonconductive parts 522-1 to 522-4 of FIG. 5A). According to an embodiment, the fourth nonconductive parts 7242 or the fifth nonconductive parts 7252 may be omitted. The third electrode tab 723 may include only a conductive part 7230. As another embodiment, the third electrode tab 723 may be omitted in the pouch type battery cell 70.

The pouch type battery cell 70 according to various embodiments is not be limited to the above-described structure. For example, in the pouch type battery cell 70, the electrode tab having a structure as the third electrode tab disposed in the third cell parts 713 is the first cell part 711, but may be disposed in the second cell part 712, the fourth cell part 714, or the fifth cell part 715.

According to various embodiments, the shapes of the first, second, fourth, and fifth electrode tabs 721, 722, 724, and 725 may be different. For example, the lengths, the thicknesses, and/or the widths of the first, second, fourth, and fifth electrode tabs 721,722,724, and 725 may be different.

In the pouch type battery cell 70 according to various embodiments, the five first to fifth electrode tabs 721 to 725 are not limited to being included in the first to fifth cell parts 711 to 715, respectively. For example, the first electrode tab 721 may be disposed in the first cell part 711, the second electrode tab 722 may be disposed in the second cell part 712, the third electrode tab 723 may be disposed in the third cell part 713, the fourth electrode tab 724 may be disposed in the fourth cell part 714, and the fifth electrode tab 725 may not be disposed in the fifth cell part 715.

In the pouch type battery cell 70 according to various embodiments, the first to third electrode tabs 721 to 723 may be disposed in the first to third cell parts 711 to 713, respectively, and the remaining two fourth and fifth electrode tabs 724 and 725 may be omitted in the remaining fourth and fifth parts 714 and 715, respectively. As another example, the third to fifth electrode tabs 723 to 725 may be disposed in the third to fifth cell parts 713 to 715, respectively, and the remaining first and second electrode tabs 721 and 722 may be omitted in the remaining first and second cell parts 711 and 712, respectively.

The battery cell electrode plate 71 according to various embodiments may be a positive electrode plate or a negative electrode plate.

According to various embodiments, the first to fifth electrode tabs 721 to 725 may be mounted on the first to fifth cell parts 711 to 715, and the mounting locations of the first to fifth electrode tabs 721 to 725 may be different. The mounting locations of the first to fifth electrode tabs 721 to 725 will be described below with reference to FIG. 7B.

Figure 7B:
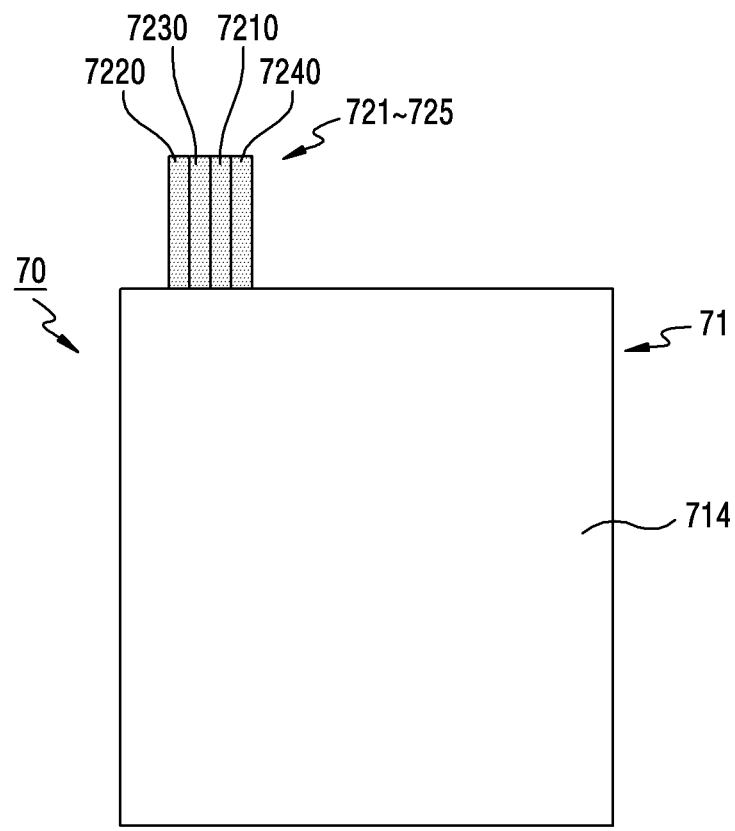
FIG. 7B is a plan view illustrating the electrode plate and the electrode tabs of the pouch type battery cell in a state of rolling according to various embodiment of the disclosure.

FIG. 7B is a plan view illustrating the battery cell electrode plate and the electrode tabs of the pouch type battery cell in a folded state according to various embodiment of the disclosure.

Referring to FIG. 7B, in the pouch type battery 70 according to various embodiments, when viewed from the vertical top of the first cell part 711, the conductive parts 7210, 7220, 7240, and 7250 of the first, second, fourth, and fifth electrode tabs 721, 722, 724, and 725, except for the third electrode tab 723, may be disposed not to overlap each other. The third electrode tab 723 may be disposed to overlap the first, second, fourth, and fifth electrode tabs 721, 722, 724, and 725.

As compared with the thickness of the pouch type battery cell tab (e.g., the thickness of the single tab 42) illustrated in FIGS. 4A and 4B, the thickness of the pouch type battery cell tab (e.g., the first to fifth electrode tabs 721 to 725) illustrated in FIG. 7B may not be increased.

Figure 8:
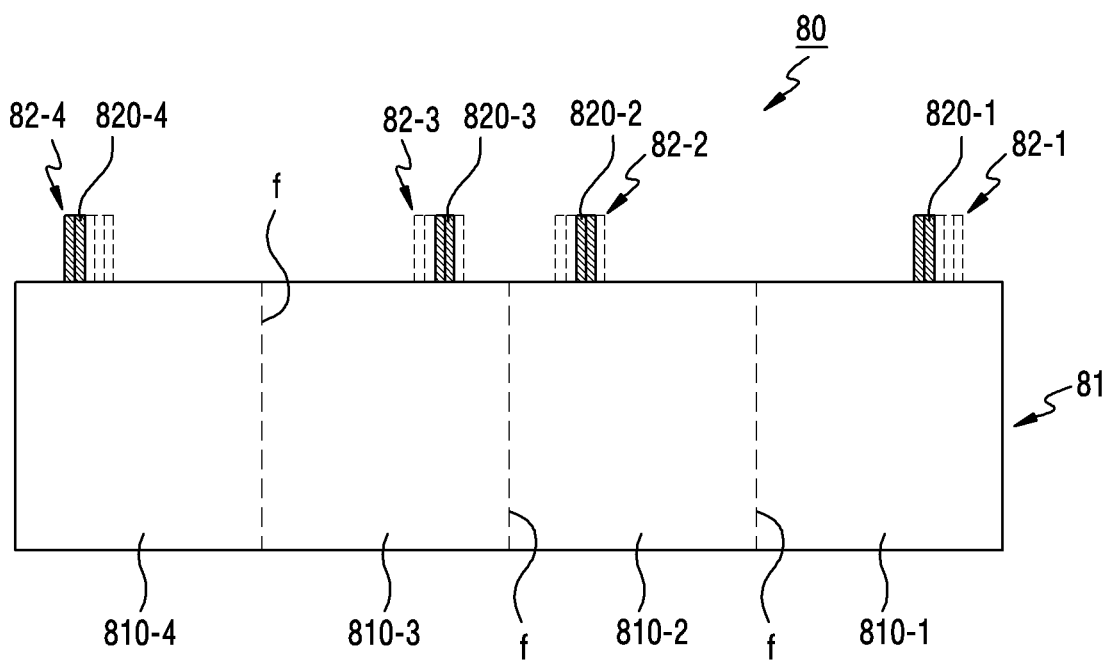
FIG. 8 is a plan view illustrating an electrode plate and electrode tabs of a pouch type battery cell in a state before rolling according to various embodiments of the disclosure.

FIG. 8 is a plan view illustrating a battery cell electrode plate and electrode tabs of a pouch type battery cell in a state before rolling according to various embodiments of the disclosure.

Referring to FIG. 8, the substantially same configurations of the pouch type battery cell 80 according to various embodiments as the configurations of the pouch type battery cell 50 illustrated in FIGS. 5A and 5B will be omitted, and differences thereof will be omitted.

A pouch type battery cell 80 according to various embodiments may include a cell electrode plate 81, first to fourth electrode tabs 82-1 to 82-4, and/or first to fourth cell parts 810-1 to 810-4.

According to an embodiment, at least one of the first to fourth electrode tabs 82-1 to 82-4 may be disposed in the first to fourth cell parts 810-1 to 810-4.

The widths of the first to fourth conductive parts 820-1 to 820-4 of the first to fourth electrode tabs 82-1 to 82-4 (e.g., the first to fourth electrode tabs 52-1 to 52-4 of FIG. 5A) may be larger than the widths of the first to fourth conductive parts 520-1 to 520-4 of the electrode tabs illustrated in FIGS. 5A and 5B.

In the pouch type battery cell 80 according to various embodiments, when the first to fourth cell parts 810-1 to 810-4 (e.g., the first to fourth cell parts 510-1 to 510-4 of FIG. 5A) are folded along the folding lines f, some of first to fourth conductive parts 820-1 to 820-4 of the first to fourth electrode tabs 82-1 to 82-4 disposed in the first to fourth cell parts 810-1 to 810-4, respectively, may be disposed not to overlap each other, and the remaining ones may be disposed to overlap each other. For example, the overlapping portions of the first to fourth electrode tabs 82-1 to 82-4 may be approximately a half of the areas thereof, and the portions of the first to fourth electrode tabs 82-1 to 82-4 may be also approximately a half of the areas thereof.

As compared with the thickness of the pouch type battery cell tab (e.g., the single tab 42) illustrated in FIGS. 4A and 4B, the thicknesses of the first to fourth electrode tabs 82-1 to 82-4 of the pouch type battery cell illustrated in FIG. 8 may substantially not be increased.

Figure 9:
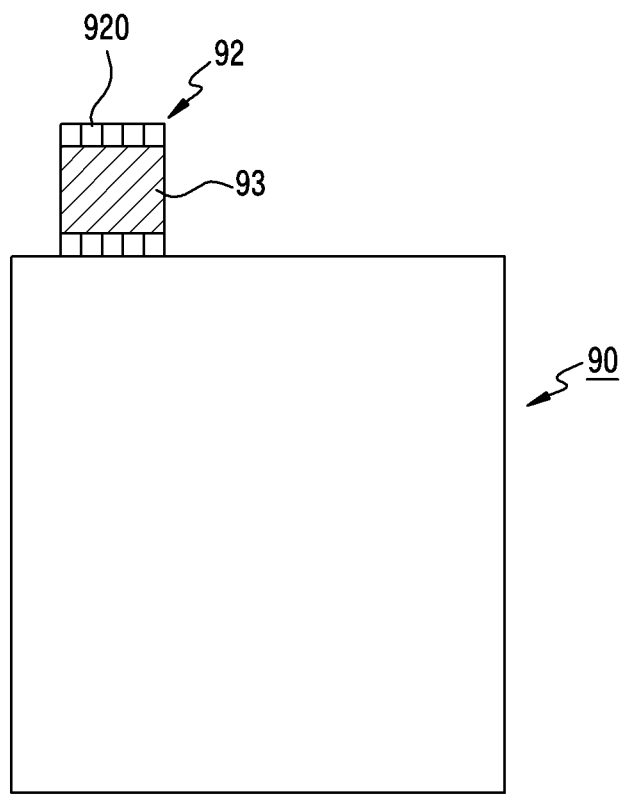
FIG. 9 is a plan view illustrating a state in which electrode tabs of a rolled pouch type battery cell are bound by using a band according to various embodiments of the disclosure.

FIG. 9 is a plan view illustrating a state in which electrode tabs of a rolled pouch type battery cell are bound by using a band according to various embodiments of the disclosure.

Referring to FIG. 9, a pouch type battery cell 90 (e.g., the battery cell 50 of FIG. 5A) according to various embodiments may employ a joining structure, for example, a conductive band 93 to improve a joining performance between electrode tabs 92 (e.g., the first to fourth electrode tabs 52-1 to 52-4 of FIG. 5A) or conductive parts 920 (e.g., the first to fourth conductive parts 520-1 to 520-4 of FIG. 5A) attached to the electrode tabs 92. For example, the band 93 may make the electrode tabs 92 a bunch by using a conductive band or a nonconductive band. The joining structure for the electrode tabs 92 may be applied to the joining structure for the electrode tabs 52-1 to 52-4, 62-1 to 62-5, 711 to 715, and 82-1 to 82-4 illustrated in FIGS. 5A to 8B, in the same way.

Figure 10A:
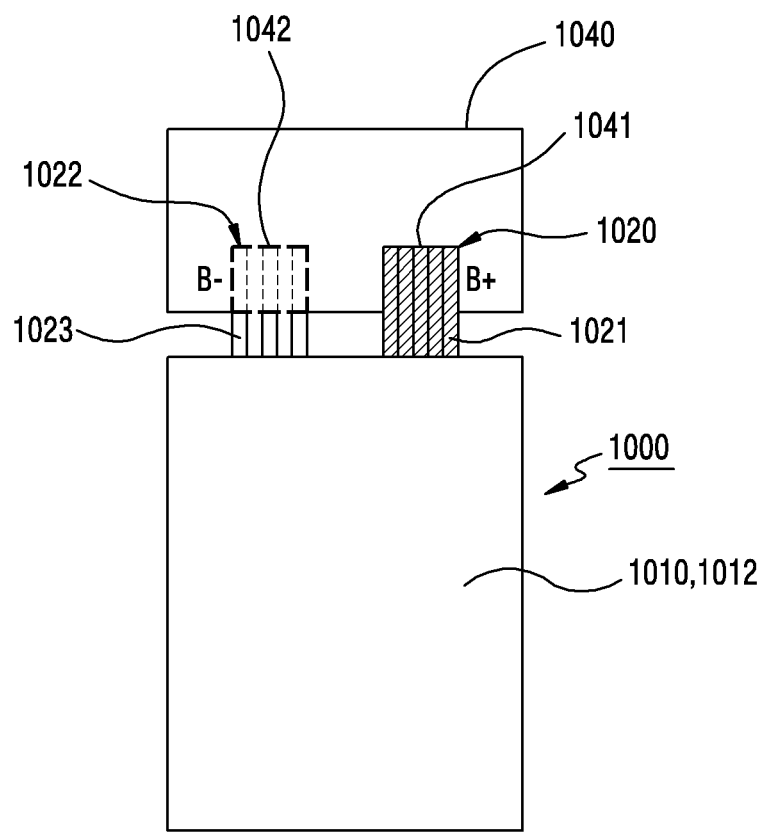
FIG. 10A is a plan view illustrating a state in which a positive battery cell and a negative battery cell are joined to a protection circuit according to various embodiments of the disclosure.
Figure 10B:
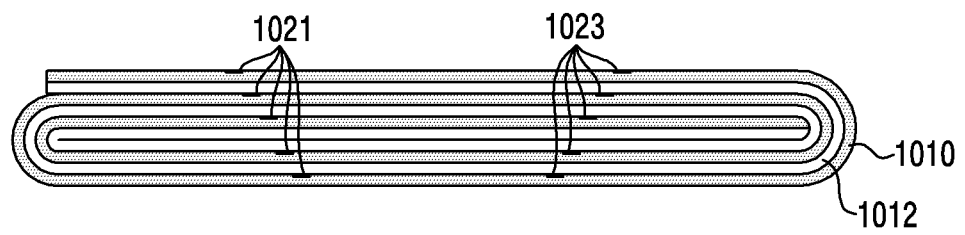
FIG. 10B is a side view illustrating a battery cell including a positive electrode battery cell and a negative electrode battery cell according to various embodiments of the disclosure.

FIG. 10A is a plan view illustrating a state in which a positive battery cell and a negative battery cell are joined to a protection circuit according to various embodiments of the disclosure. FIG. 10B is a side view illustrating a battery cell including a positive electrode battery cell and a negative electrode battery cell according to various embodiments of the disclosure.

Referring to FIGS. 10A and 10B, positive electrode tabs 1020 (e.g., the first to fourth electrode tabs 52-1 to 52-4 of FIG. 5A) and negative electrode tabs 1022 (e.g., the first to fourth electrode tabs 52-1 to 52-4 of FIG. 5A) protruding from positive electrode and negative electrode cell parts 1010 and 1012 (e.g., the first to fourth cell parts 510-1 to 510-4 of FIG. 5A) as in FIGS. 5A and 5B may be joined to a positive electrode joining part 1041 (B+) and a negative electrode joining part 1042 (B−) of a battery protection circuit 1040 and electrically connect the cell parts 1010 and 1012 to a protection circuit 1040.

In the pouch type battery cell 1000 (e.g., the battery cell 50 of FIG. 5A) according to various embodiments, when the stacked uppermost positive electrode cell part 1010 is viewed from the vertical top, the negative electrode tabs 1022 may be disposed not to overlap each other and the positive electrode tabs 1020 may be disposed not to overlap each other.

The negative electrode tabs 1022 of the pouch type battery cell 1000 according to various embodiments may include the first conductive parts 1023 (e.g., the first to fourth conductive parts 520-1 to 520-4 of FIG. 5A), and when the stacked uppermost cell part 1010 (e.g., the first to fourth cell parts 510-1 to 510-4 of FIG. 5A) is viewed from the vertical top, the first conductive parts 1023 of the negative electrode tabs may be disposed not to overlap each other. The positive electrode tabs 1020 of the pouch type battery cell 1000 according to various embodiments may include second conductive parts 1021, respectively, and when the stacked uppermost cell part 1010 is viewed from the vertical top, the second conductive parts 1021 of the positive electrode tabs may be disposed not to overlap each other.

The negative electrode tabs 1022 of the pouch type battery cell according to various embodiments may be disposed not to overlap the positive electrode tabs 1020. The first conductive parts 1023 of the pouch type battery cell 1000 according to various embodiments may be disposed not to overlap the second conductive parts 1021.

Figure 11:
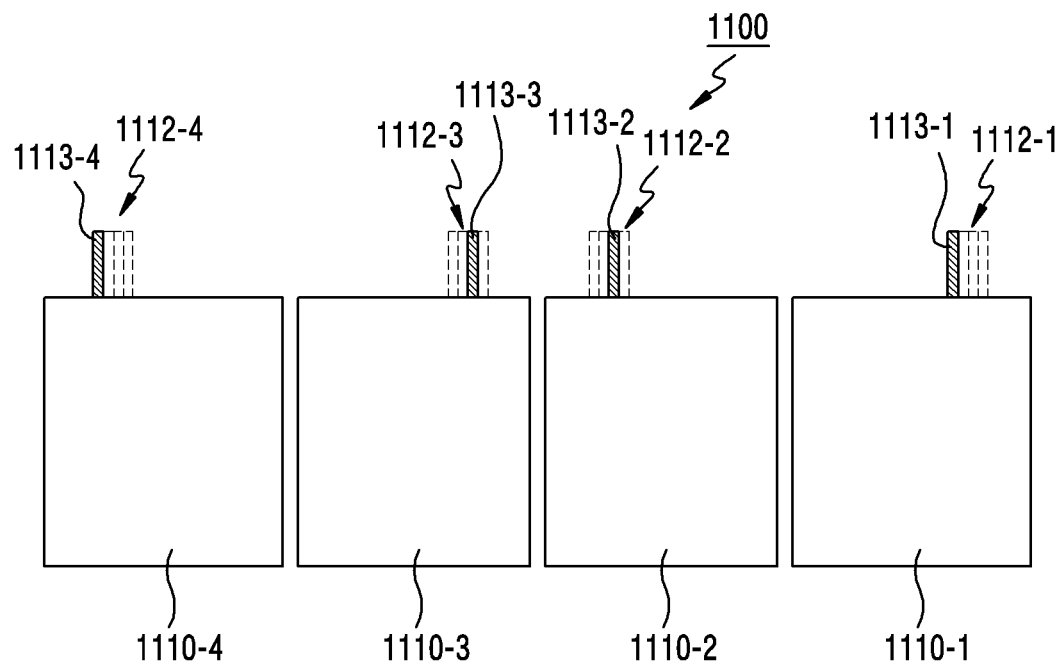
FIGS. 11 to 14 are plan views illustrating cell parts and electrode tabs, which are separated from each other, according to various embodiments of the disclosure.

FIG. 11 is a plan view illustrating separated cell parts and electrode tabs disposed in the cell parts according to various embodiments of the disclosure.

Referring to FIG. 11, the substantially same configurations of the pouch type battery cell 1100 according to various embodiments as the configurations of the pouch type battery cell 50 illustrated in FIGS. 5A and 5B will be omitted, and differences thereof will be omitted.

In the pouch type battery cell 1100 according to various embodiments, first to fourth cell parts 1110-1 to 1110-4 (e.g., the first to fourth cell parts 510-1 to 510-4 of FIG. 5A) may be disposed to be separated from each other. In the pouch type battery cell 1100, the first to fourth cell parts 1110-1 to 1110-4, which are separated from each other, may be disposed in a stack type. If the first to fourth cell parts 1110-1 to 1110-4 are disposed in a stack type, the first to fourth conductive parts 1113-1 to 1113-4 (e.g., the first to fourth conductive parts 520-1 to 520-4 of FIG. 5A) of the first to fourth electrode tabs 1112-1 to 1112-4 (e.g., the first to fourth electrode tabs 52-1 to 52-4 of FIG. 5A) provided in the first to fourth cell parts 1110-1 to 1110-4 may be disposed not to overlap each other.

The pouch type battery cell 1100 according to various embodiments may include first to fourth cell parts 1110-1 to 1110-4 and first to fourth electrode tabs 1112-1 to 1112-4.

According to various embodiments, the first electrode tab 1112-1 may be disposed in the first cell part 1110-1, the second electrode tab 1112-2 may be disposed in the second cell part 1110-2, the third electrode tab 1112-3 may be disposed in the third cell part 1110-3, and the fourth electrode tab 1112-4 may not be disposed in the fourth cell part 1110-4.

According to an embodiment, at least one of the first to fourth electrode tabs 1112-1 to 1112-4 may be disposed in the first to fourth cell parts 1110-1 to 1110-4.

As compared with the thickness of the pouch type battery cell tab (e.g., the thickness of the single tab 42) illustrated in FIGS. 4A and 4B, the thickness of the pouch type battery cell tab (e.g., the first to fourth electrode tabs 1112-1 to 1112-4) illustrated in FIG. 11 may not be increased.

Figure 12:
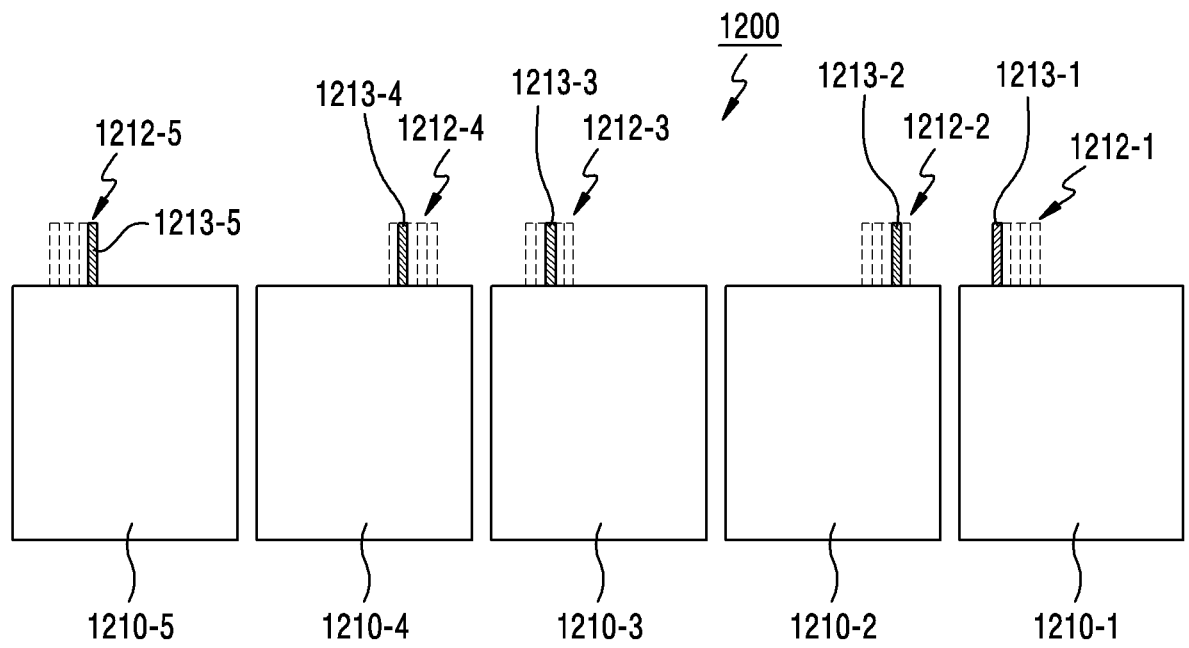

FIG. 12 is a plan view illustrating separated cell parts and electrode tabs disposed in the cell parts according to various embodiments of the disclosure.

Referring to FIG. 12, the substantially same configurations of the pouch type battery cell 1200 according to various embodiments as the configurations of the pouch type battery cell 60 illustrated in FIGS. 6A and 6B will be omitted, and differences thereof will be omitted.

In the pouch type battery cell 1200 according to various embodiments, first to fourth cell parts 1210-1 to 1210-4 (e.g., the first to fourth cell parts 510-1 to 510-4 of FIG. 5A) may be disposed to be separated from each other. In the pouch type battery cell 1200, the first to fourth cell parts 1210-1 to 1210-4, which are separated from each other, may be disposed in a stack type. If the first to fourth cell parts 1210-1 to 1210-4 are disposed in a stack type, the first to fourth conductive parts 1213-1 to 1213-4 (e.g., the first to fourth conductive parts 520-1 to 520-4 of FIG. 5A) of the first to fourth electrode tabs 1212-1 to 1212-4 (e.g., the first to fourth electrode tabs 52-1 to 52-4 of FIG. 5A) provided in the first to fourth cell parts 1210-1 to 1210-4 may be disposed not to overlap each other.

The pouch type battery cell 1200 according to various embodiments may include first to fourth cell parts 1210-1 to 1210-4 and first to fourth electrode tabs 1212-1 to 1212-4.

According to various embodiments, the first electrode tab 1212-1 may be disposed in the first cell part 1210-1, the second electrode tab 1212-2 may be disposed in the second cell part 1210-2, the third electrode tab 1212-3 may be disposed in the third cell part 1210-3, and the fourth electrode tab 1212-4 may not be disposed in the fourth cell part 1210-4.

According to an embodiment, at least one of the first to fourth electrode tabs 1212-1 to 1212-4 may be disposed in the first to fourth cell parts 1210-1 to 1210-4.

As compared with the thickness of the pouch type battery cell tab (e.g., the thickness of the single tab 42) illustrated in FIGS. 4A and 4B, the thickness of the pouch type battery cell tab (e.g., the first to fourth electrode tabs 1212-1 to 1212-4) illustrated in FIG. 12 may substantially not be increased.

Figure 13:
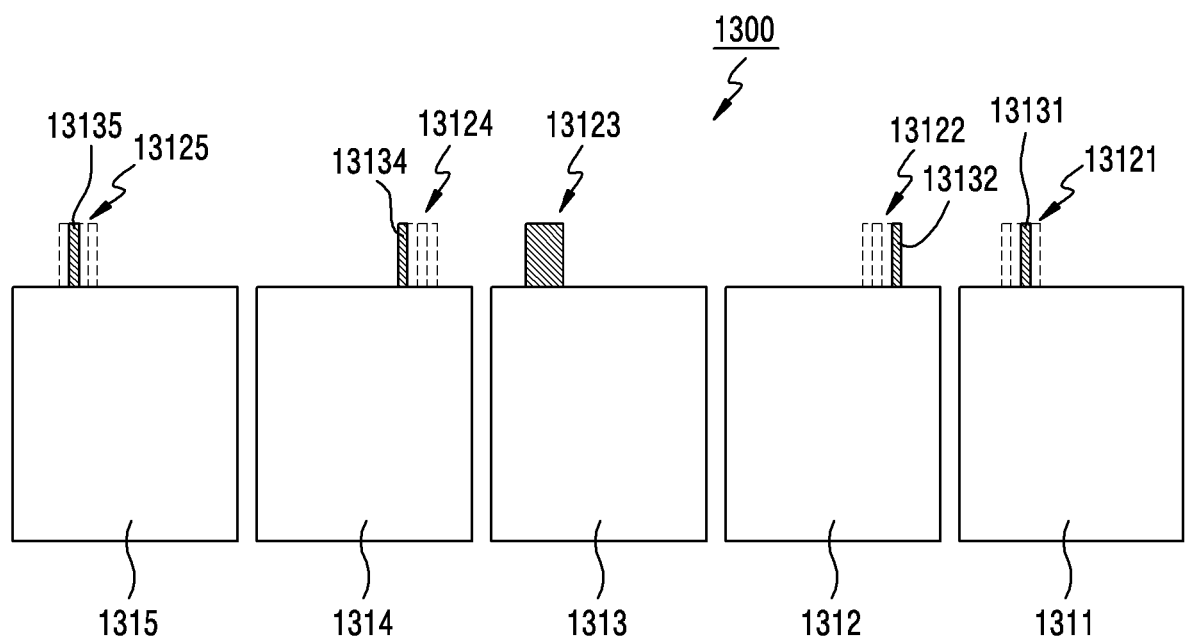

FIG. 13 is a plan view illustrating separated cell parts and electrode tabs disposed in the cell parts according to various embodiments of the disclosure.

Referring to FIG. 13, the same configurations of the pouch type battery cell 1300 according to various embodiments as the configurations of the pouch type battery cell 70 illustrated in FIGS. 7A and 7B will be omitted, and differences thereof will be omitted.

In the pouch type battery cell 1300 according to various embodiments, first to fourth cell parts 1311 to 1315 (e.g., the first to fourth cell parts 510-1 to 510-4 of FIG. 5A) may be disposed to be separated from each other. In the pouch type battery cell 1300, the first to fifth cell parts 1311 to 1315, which are separated from each other, may be disposed in a stack type. If the first to fifth cell parts 1311 to 1315 are disposed in a stack type, the first, second, fourth, and fifth conductive parts 13131, 13132, 13134, and 13135 (e.g., the conductive parts 520-1 to 520-4 of FIG. 5A of the electrode tabs 52-1 to 52-4 of FIG. 5A) may be disposed not to overlap each other, and the first, second, fourth, and fifth conductive parts 13131, 13132, 13134, and 13135 of the third electrode tab 13123 may be disposed to overlap each other.

The pouch type battery cell 1300 according to various embodiments may include first to fifth cell parts 1311 to 1315 and/or first to fifth electrode tabs 13121 to 13125.

According to various embodiments, the first electrode tab 13121 may be disposed in the first cell part 1311, the second electrode tab 13122 may be disposed in the second cell part 1312, the third electrode tab 13123 may be disposed in the third cell part 1313, the fourth electrode tab 13124 may be disposed in the fourth cell part 1314, and the fifth electrode tab 13125 may not be disposed in the fifth cell part 1315.

According to an embodiment, at least one of the first to fifth electrode tabs 13121 to 13125 may be disposed in the first to fifth cell parts 1311 to 1315.

As compared with the thickness of the pouch type battery cell tab (e.g., the thickness of the single tab 42) illustrated in FIGS. 4A and 4B, the thickness of the pouch type battery cell tab (e.g., the first to fifth electrode tabs 13121 to 13125) illustrated in FIG. 13 may substantially not be increased.

Figure 14:
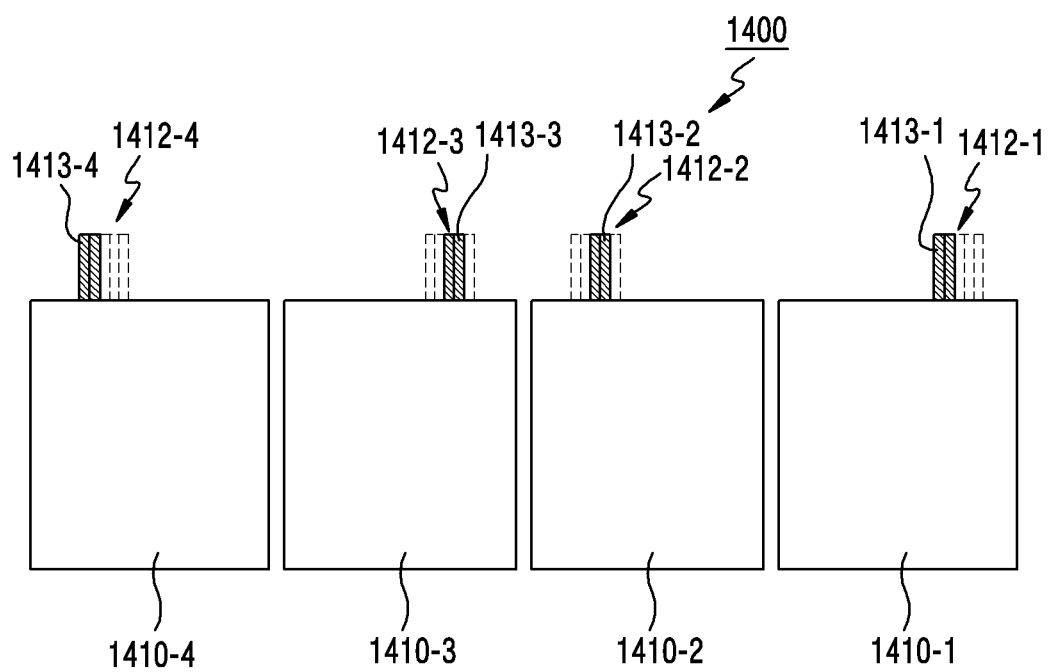

FIG. 14 is a plan view illustrating separated cell parts and electrode tabs disposed in the cell parts according to various embodiments of the disclosure.

Referring to FIG. 14, the substantially same configurations of the pouch type battery cell 1400 according to various embodiments as the configurations of the pouch type battery cell 80 illustrated in FIGS. 8A and 8B will be omitted, and differences thereof will be omitted.

In the pouch type battery cell 1400 according to various embodiments, first to fourth cell parts 1410-1 to 1410-4 (e.g., the first to fourth cell parts 510-1 to 510-4 of FIG. 5A) may be disposed to be separated from each other. In the pouch type battery cell 1400, the first to fourth cell parts 1410-1 to 1410-4, which are separated from each other, may be disposed in a stack type. If the first to fourth cell parts 1410-1 to 1410-4 are disposed in a stack type, the first to fourth conductive parts 1413-1 to 1413-4 (e.g., the first to fourth conductive parts 520-1 to 520-4 of FIG. 5A) of the first to fourth electrode tabs 1412-1 to 1412-4 (e.g., the first to fourth electrode tabs 52-1 to 52-4 of FIG. 5A) provided in the first to fourth cell parts 1410-1 to 1410-4 may be disposed such that some of them overlap each other and the remaining ones thereof do not overlap each other.

The pouch type battery cell 1400 according to various embodiments may include first to fourth cell parts 1410-1 to 1410-4 and first to fourth electrode tabs 1412-1 to 1412-4.

According to various embodiments, the first electrode tab 1412-1 may be disposed in the first cell part 1410-1, the second electrode tab 1412-2 may be disposed in the second cell part 1410-2, the third electrode tab 1412-3 may be disposed in the third cell part 1410-3, and the fourth electrode tab 1412-4 may not be disposed in the fourth cell part 1410-4.

According to an embodiment, at least one of the first to fourth electrode tabs 1412-1 to 1412-4 may be disposed in the first to fourth cell parts 1410-1 to 1410-4.

As compared with the thickness of the pouch type battery cell tab (e.g., the thickness of the single tab 42) illustrated in FIGS. 4A and 4B, the thickness of the pouch type battery cell tab (e.g., the first to fourth electrode tabs 1412-1 to 1412-4) illustrated in FIG. 14 may substantially not be increased.

Figure 15A:
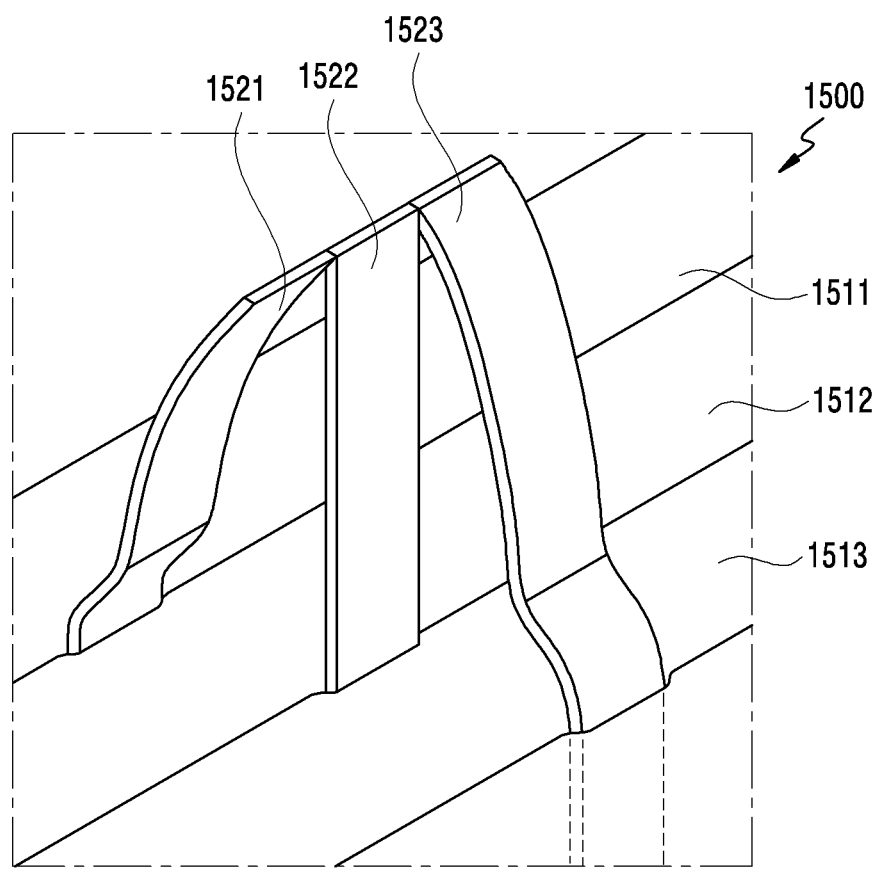
FIG. 15A is a side view illustrating configurations of electrode tabs of a pouch type battery cell according to various embodiments of the disclosure.

Referring to FIG. 15A, in the pouch type battery cell 1500 according to various embodiments, the shapes of the first to third electrode tabs 1521 to 1523 disposed in the first to third cell parts 1511 to 1513 may be different.

According to an embodiment, by making the shapes of the first to third electrode tabs 1521 to 1523 different, the joining performance of the first to third electrode tabs 1521 to 1523 can be improved when the first to third electrode tabs 1521 to 1523 are bound in a bunch. For example, the electrode tabs 1521 and 1523 located at peripheries may be disposed to be deflected or inclined to face the electrode tab 1522 located at the center.

According to an embodiment, when the pouch type battery cell 1500 is viewed from the front side, the first electrode tab 1521 and the third electrode tab 1523 located while the second electrode tab 1522 is located in the middle may be disposed to be deflected or inclined toward the second electrode tab 1522.

According to an embodiment, when the pouch type battery cell 1500 has first to third electrode tabs 1521 to 1523 of different shapes, the first electrode tab 1521 or the third electrode tab 1523 may be bent toward the second electrode tab 1522 while the second electrode tab 1522 is located in the middle. The first and third electrode tabs 1521 and 1523 may be bent toward the first electrode tab 1522 to form a joining structure between electrode tabs at at least a portion of the folded cell parts when the cell parts are folded.

As another example, in the battery cell 1500, the first to third electrode tabs 1521 to 1523 may be formed in the form of a single electrode tab by using a band (e.g., the band 93 illustrated in FIG. 9). An end of the first electrode tab 1521 or the third electrode tab 1523 may be connected to the second electrode tab 1522. For example, the bending angle of the first electrode tab 1521 or the third electrode tab 1523 may be approximately 30 degrees or 90 degrees.

According to an embodiment, because the first to third electrode tabs 1521 to 1523 of different shapes are disposed to have a single electrode tab shape, the thicknesses of the first to third electrode tabs 1521 to 1523 may be reduced. The first to third electrode tabs 1521 to 1523 may be disposed to have different thicknesses and/or widths.

Figure 15B:
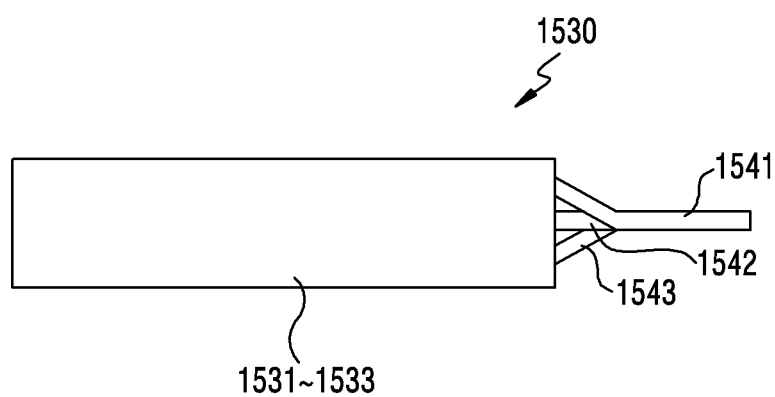
FIG. 15B is a side view illustrating configurations of the electrode tabs of the pouch type battery cell according to various embodiments of the disclosure.

Referring to FIG. 15B, when the pouch type battery cell 1530 is viewed from a side, the first electrode tab 1541 and the third electrode tab 1542 located while the second electrode tab 1542 is taken as the center may be disposed to be deflected or inclined toward the second electrode tab 1543.

For example, when the first to third electrode tabs 1541 to 1543 of different shapes are disposed, the first electrode tab 1541 or the third electrode tab 1543 may be deflected or inclined toward the second electrode tab 1522 while the second electrode tab 1542 is located in the middle. As another example, in the battery cell 1530, the first to third electrode tabs 1541 to 1543 may be formed in the form of a single electrode tab by using a band (e.g., the band 93 illustrated in FIG. 9). A portion of the first electrode tab 1541 or the third electrode tab 1543 may be connected to the second electrode tab 1542. The first to third electrode tabs 1541 to 1543 may be disposed to have different thicknesses and/or widths.

Figure 16A:
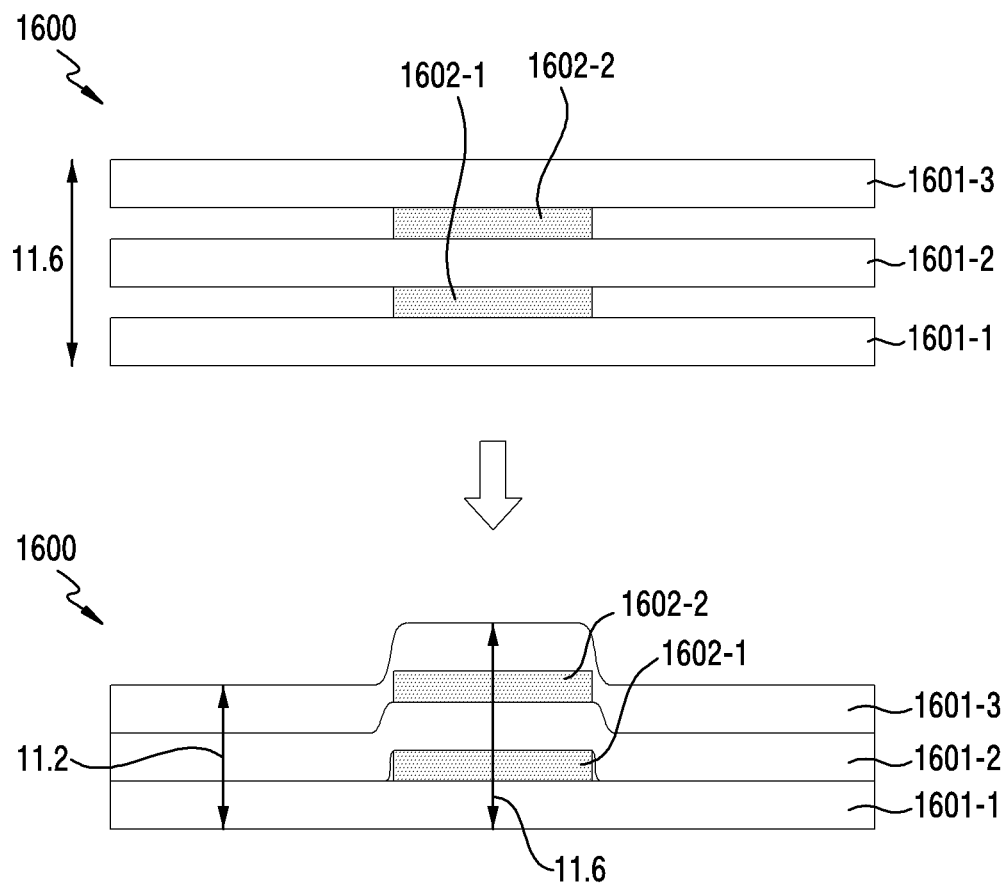
FIG. 16A is a side view illustrating a pouch type battery cell, in which electrode tabs are disposed to overlap each other, according to various embodiments.

FIG. 16A is a side view illustrating a state in which the first and second electrode tabs 1602-1 and 1602-2 are disposed between the first to third cell parts 1601-1 to 1601-3 to overlap each other when the pouch type battery cell 1600 (e.g., the pouch type battery cell 40 of FIG. 4a) is viewed from the vertical top.

It is assumed that the thicknesses of the first to third cell parts 1601-1 to 1601-3 are substantially the same and the thicknesses of the first and second electrode tabs 1602-1 and 1602-2 are substantially the same. For example, the thicknesses of the first to third cell parts 1601-1 to 1601-3 are 0.4 mm and the thicknesses of the first and second electrode tabs 1602-1 to 1602-2 are 0.2 mm, the vertical thickness of the pouch type battery cell 1600 may be approximately 1.6 mm when the pouch type battery cell 1600 is pressed upwards and downwards. If the thicknesses of the overlapping portions of the first to third cell parts 1601-1 to 1601-3 and the first and second electrode tabs 1602-1 and 1602-2 are added, the resultant thickness may be approximately 1.6 mm.

Figure 16B:
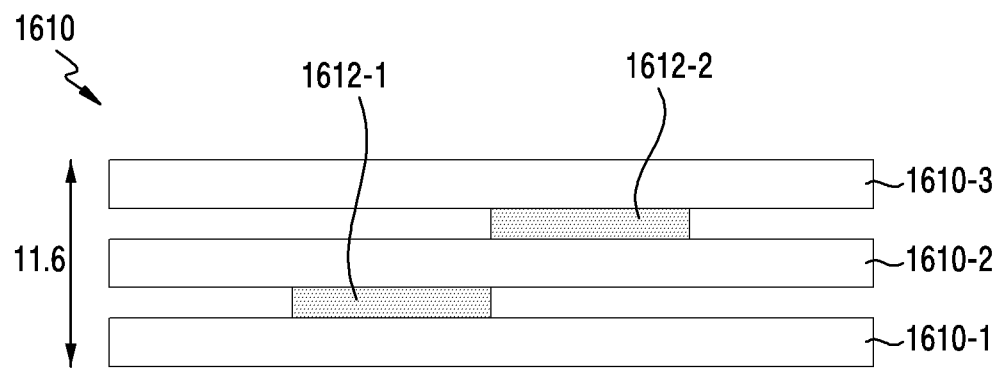
FIG. 16B is a side view illustrating a pouch type battery cell, in which electrode tabs are disposed not to overlap each other, according to various embodiments of the disclosure.
Figure 16B:
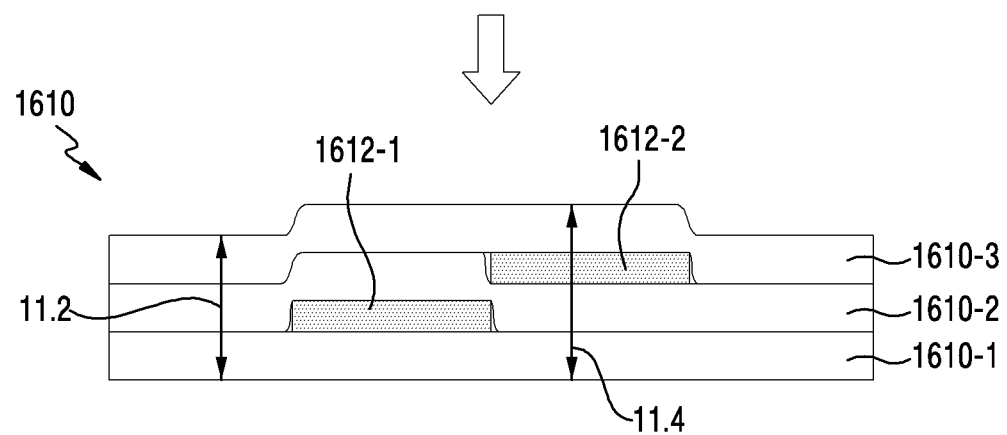

FIG. 16B is a side view illustrating a state in which the first and second electrode tabs 1612-1 and 1612-2 are disposed between the first to third cell parts 1611-1 to 1611-3 not to overlap each other when the pouch type battery cell 1610 (e.g., the pouch type battery cell 50 of FIG. 5a) is viewed from the vertical top.

According to an embodiment, it is assumed that the thicknesses of the first to third cell parts 1611-1 to 1611-3 are substantially the same and the thicknesses of the first and second electrode tabs 1612-1 and 1612-2 are substantially the same. For example, the thicknesses of the first to third cell parts 1611-1 to 1611-3 are 0.4 mm and the thicknesses of the first and second electrode tabs 1612-1 to 1612-2 are 0.2 mm, the vertical thickness of the pouch type battery cell 1600 may be approximately 1.4 mm when the pouch type battery cell 1610 is pressed upwards and downwards. If the thicknesses of the overlapping portions of the first to third cell parts 1611-1 to 1611-3 and the first and second electrode tabs 1612-1 and 1612-2 are added, the resultant thickness may be approximately 1.4 mm. For example, it can be seen than the vertical thickness of the pouch type battery cell 1610 illustrated in FIG. 16B is smaller than the vertical thickness of the pouch type battery cell 1600 illustrated in FIG. 16A by approximately 0.2 mm. The slimmed structure of the pouch type battery cell 1610 can reduce the thickness of the pouch type battery cell because an increment of the thickness of the overlapping portions caused by the first and second electrode tabs 1612-1 and 1612-2 is distributed when the first and second electrode tabs 1612-1 and 1612-2 and the first to third cell parts 1611-1 to 1611-3 are disposed not to overlap each other.

A structure, in which the first and second electrode tabs 1602-1 and 1602-2 are disposed in the first to third cell parts 1601-1 to 1601-3 not to overlap each other, may be more advantageous in terms of the slimness of the pouch type battery cell than a structure, in which the first and second electrode tabs 1612-1 and 1612-2 are disposed in the first to third cell parts 1611-1 to 1611-3 to overlap each other.

Figure 17:
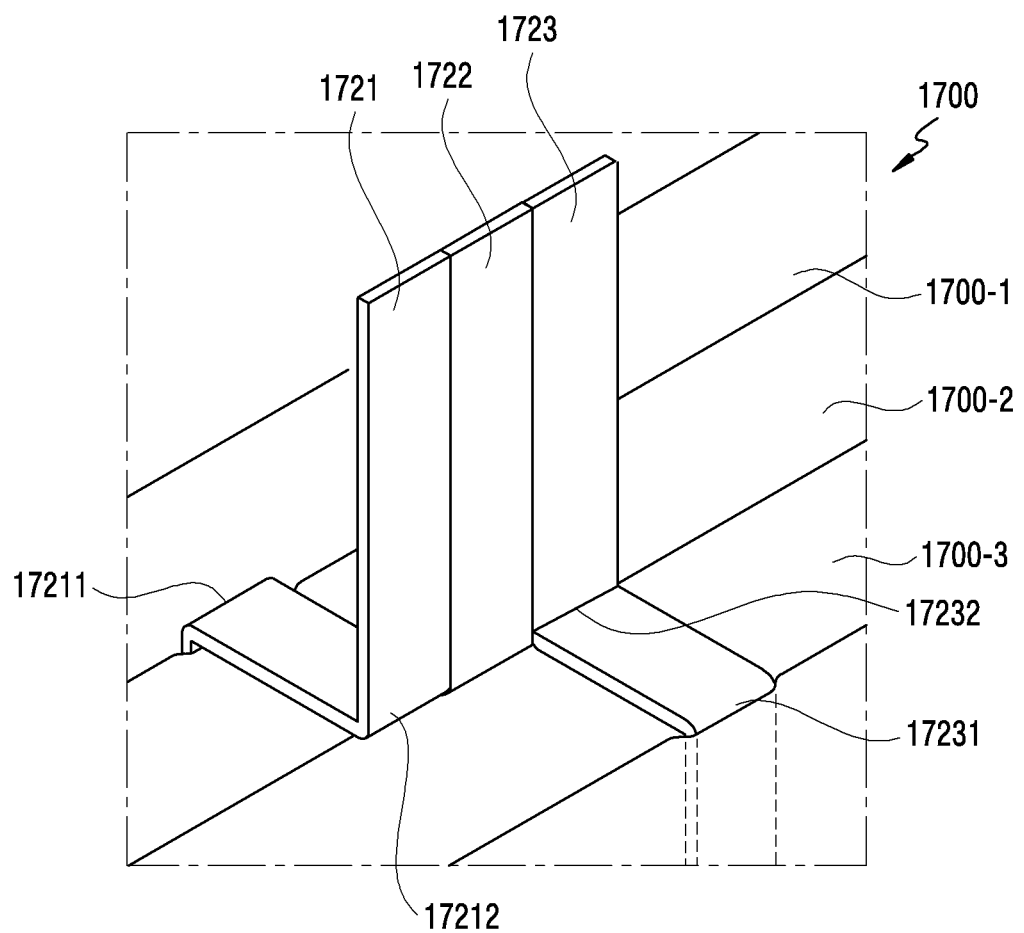
FIG. 17 is a perspective view illustrating a state, in which electrode tabs having one or more bending parts are disposed in parallel while not overlapping each other, according to various embodiments of the disclosure.

Referring to FIG. 17, the pouch type battery cell 1700 (e.g., the battery cell 50 of FIG. 5A) according to various embodiments may include a plurality of cell parts 1700-1 to 1700-3 (e.g., the first to fourth cell parts 510-1 to 510-4 of FIG. 5A), and a plurality of electrode tabs 1721 to 1723 (e.g., the first to fourth electrode tabs 52-1 to 52-4 of FIG. 5A) including one or more bending parts 17211, 17212, 17231, and 17232 disposed in one or more cell parts, among the plurality of cell parts, for example, a plurality of conductive members (e.g., the first to fourth conductive members 520-1 to 520-4 of FIG. 5A).

In the battery cell 1700 according to various embodiments, one or more bending parts 17211, 17212, 17231, and 17232 may be disposed in one or more electrode tabs, among the electrode tabs 1721 to 1723. The electrode tabs 1721 and 1723 having one or more bending parts 17211, 17212, 17231, and 17232 may face the electrode tab 1722 located in the middle to gather while the electrode tab 1722 in the middle is located between the electrode tabs 1721 and 1723.

The battery cell 1700 according to various embodiments may include first to third cell parts 1700-1 to 1700-3, and first to third electrode tabs 1721 to 1723 disposed in the first to third cell parts 1700-1 to 1700-3. The first electrode tab 1721 may protrude from a periphery of the first cell part 1700-1, the second electrode tab 1722 may protrude from a periphery of the second cell part 1700-2, and the third electrode tab 1723 may protrude from a periphery of the third cell part 1700-3.

The first to third electrode tab 1700-1 to 1700-3 according to various embodiments may be disposed not to overlap each other when viewed from the top of the outer sides of the cell parts. In the battery cell 1700 according to various embodiments, the first to third electrode tabs 1721 to 1723 that do not overlap each other and are parallel to each other when the cell parts, in which the first to third electrode tabs 1700-1 to 1700-3 are disposed, may be substantially the same as or similar to the thickness of the thickness of one electrode tab.

The first electrode tab 1721 according to various embodiments may include one or more bending parts 17211 and 17212. For example, the first electrode tab 1721 may include a first bending part 17211 that is bent immediately after the first electrode tab 1721 is extracted from the first cell part 1700-1, and a second bending part 17212 that is bent around the second electrode tab 1722. The first electrode tab 1721 may be extracted from the first cell part 1700-1 to face the second electrode tab 1722 due to the first bending part 17211, and may be disposed to be parallel to the second electrode tab 1722 while not overlapping the second electrode tab 1722 due to the second bending part 17212. The third electrode tab 1723 may be extracted from the third cell part 1700-3 to face the second electrode tab 1722 due to the first bending part 17231, and may be disposed to be parallel to the second electrode tab 1722 while not overlapping the second electrode tab 1722 due to the second bending part 17232. For example, although the first bending part 17211 of the first electrode tab 1721 is bent by approximately 90 degrees, the disclosure is not limited thereto and the first bending part 17211 may be bent at various angles, and although the second bending parts 17211 is bent at approximately 90 degrees, but the disclosure is not limited thereto and the second bending parts 17211 may be bent at various angles. For example, although the first bending part 17231 of the third electrode tab 1723 is bent by approximately 90 degrees, the disclosure is not limited thereto and the first bending part 17231 may be bent at various angles, and although the second bending parts 17232 is bent at approximately 90 degrees, but the disclosure is not limited thereto and the second bending parts 17232 may be bent at various angles.

The arrangement structure of the first to third electrode tabs 1721 to 1723 may be advantageous in the terms of the slimness of the joining structure of a plurality of electrode tabs.

According to various embodiments, an electronic device (e.g., the electronic device 100 of FIG. 1) may include: a housing (e.g., the housing 110 of FIG. 1) may include: a first plate (e.g., the front plate 102 of FIG. 1); a second plate (e.g., the rear plate 111 of FIG. 2) facing an opposite side to the first plate (e.g., the front plate 102 of FIG. 1); and a side member (e.g., the side member 118 of FIG. 1) surrounding a space between the first plate 102 and the second plate 111, and connected to the second plate 111 or integrally formed with the second plate 111; a display (e.g., the display 101 of FIG. 1) viewed through at least a portion of the first plate 102; a battery disposed in the housing (e.g., the housing 110 of FIG. 1), the battery including: a battery cell (the battery cell 50 of FIG. 5A) including a plurality of cell parts (e.g., the first to fourth cell parts 510-1 to 510-4 of FIG. 5A) disposed such that at least portions of the plurality of cell parts 510-1 to 510-4 overlap each other when viewed from the top of one surface of the battery; and a plurality of conductive members (e.g., the first to fourth conductive members 520-1 to 520-4 of FIG. 5A) disposed such that the plurality of conductive members (e.g., the first to fourth conductive members 520-1 to 520-4 of FIG. 5A) do not overlap each other at peripheries of the plurality of cell parts 510-1 to 510-4 when viewed from the top of one surface of the battery; a battery protection circuit (e.g., the protection circuit 1040 of FIG. 10A) joined to the plurality of conductive members (e.g., the first to fourth conductive members 520-1 to 520-4 of FIG. 5A); and a processor operatively connected to the display 101 and the battery.

According to various embodiments, at least one of the plurality of conductive members (e.g., the first to fourth conductive members 520-1 to 520-4 of FIG. 5A) is linear or curved.

According to various embodiments, the plurality of conductive members (e.g., the first to fourth conductive members 520-1 to 520-4 of FIG. 5A) may be bound as a single body by using a conductive band (e.g., the conductive band 93 of FIG. 9).

According to various embodiments, the plurality of conductive members (e.g., the first to fourth conductive members 520-1 to 520-4 of FIG. 5A) may protrude at peripheries of the cell parts (e.g., the first to fourth cell parts 510-1 to 510-4 of FIG. 5A), respectively.

According to various embodiments, among the plurality of conductive members (e.g., the first to third conductive members 1721-1 to 1721-3 of FIG. 17), at least one conductive member may have one or more bending parts (e.g., the first and second bending parts 17211, 17212, 17231, and 17232 of FIG. 17).

According to various embodiments, each of the cell parts (e.g., the first to fourth cell parts 510-1 to 510-4 of FIG. 5A) may have a rectangular shape when viewed from one surface of the battery.

According to various embodiments, the plurality of cell parts (e.g., the first to fourth cell parts 510-1 to 510-4 of FIG. 5A) may be disposed to be folded, rolled, or stacked.

According to various embodiments, the plurality of conductive members (e.g., the first to fourth conductive members 520-1 to 520-4 of FIG. 5A) may be formed to have different lengths, different thicknesses, and different widths.

According to various embodiments, the electronic device (e.g., the electronic device 100 of FIG. 1) may further include a printed circuit board (e.g., the printed circuit board 340 of FIG. 3) in the space, and the plurality of conductive members (e.g., the conductive members 520-1 to 520-4 of FIG. 5A) may be electrically connected to a printed circuit board 340.

According to various embodiments, the plurality of conductive members (e.g., the first to fourth conductive members 520-1 to 520-4 of FIG. 5A) may define positive electrode tabs or negative electrode tabs of the battery cell.

According to various embodiments, an electronic device (e.g., the electronic device 100 of FIG. 1) may include: a housing (e.g., the housing 110 of FIG. 1) including: a first plate (e.g., the front plate 102 of FIG. 1); a second plate (e.g., the rear plate 111 of FIG. 2) facing an opposite side of the first plate 102; and a side member (e.g., the side member 118 of FIG. 10) surrounding a space between the first plate 102 and the second plate 111; a display (e.g., the display 101 of FIG. 1) disposed in the space and visually exposed through at least a portion of the first plate 102; and a battery disposed in the space to be parallel to the first plate 102, the battery including: a battery cell (e.g., the battery pattern 50 of FIG. 5A) including a plurality of cell parts (e.g., the first to fourth cell parts 510-1 to 510-4 of FIG. 5A) disposed such that at least portions of the plurality of cell parts (e.g., the first to fourth cell parts 510-1 to 510-4 of FIG. 5A) overlap each other when the first plate is viewed from the top; and a plurality of electrode tabs (e.g., the first to fourth electrode tabs 52-1 to 52-4 of FIG. 5A) protruding to the outside from at least two cell parts, among the plurality of cell parts (e.g., the first to fourth cell parts 510-1 to 510-4 of FIG. 5A), wherein one or more electrode tabs (e.g., the first to fourth electrode tabs 52-1 to 52-4 of FIG. 5A), among the plurality of electrode tabs (e.g., the first to fourth electrode tabs 52-1 to 52-4 of FIG. 5A) protruding from the at least two cell parts, are disposed to be at least partially parallel to each other when the first plate is viewed from the top.

According to various embodiments, the one or more electrode tabs (e.g., the first to fourth electrode tabs 52-1 to 52-4 of FIG. 5A) may be disposed in parallel to each other while not overlapping each other.

According to various embodiments, the one or more electrode tabs, among the plurality of electrode tabs (e.g., the first to fourth electrode tabs 52-1 to 52-4 of FIG. 5A), may include one or more bending parts (e.g., the first and second bending parts 17211, 17212, 17231, and 17232 of FIG. 17).

According to various embodiments, the plurality of electrode tabs (e.g., the first to fourth electrode tabs 52-1 to 52-4 of FIG. 5A) may include positive electrode tabs or negative electrode tabs.

According to various embodiments, the plurality of electrode tabs (e.g., the first to fourth electrode tabs 52-1 to 52-4 of FIG. 5A) may be bound as a single body and joined to each other by a conductive structure, and the conductive structure may include a conductive band (e.g., the conductive band 93 of FIG. 9).

The embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

The invention claimed is:

1. An electronic device comprising:
a housing comprising:
a first plate;
a second plate facing an opposite side to the first plate; and
a side member surrounding a space between the first plate and the second plate, and connected to the second plate or integrally formed with the second plate;
a display viewed through at least a portion of the first plate;
a battery disposed in the housing,
the battery comprising:
a battery cell comprising a plurality of cell parts disposed such that at least portions of the plurality of cell parts overlap each other when viewed from a top of one surface of the battery; and
a plurality of conductive members disposed such that the plurality of conductive members do not overlap each other at peripheries of the plurality of cell parts when viewed from the top of one surface of the battery, and wherein each of the plurality of conductive members is same electrode;
a battery protection circuit joined to the plurality of conductive members; and
a processor operatively connected to the display and the battery, and
wherein, the plurality of conductive members comprises;
a first conductive member having a first width; and
a plurality of second conductive members spaced apart from each other and spaced apart from the first conductive member, and having a second width shorter than the first width, respectively and
wherein in a state of unfolding, the first conductive member is not overlapped with the plurality of second conductive members and each one of the plurality of second conductive members is not overlapped with each other when viewed from the top of one surface of the battery, and
wherein in a state of folding, the each one of the plurality of second conductive members is not overlapped with each other and is overlapped with the first conductive member when viewed from the top of the surface of the battery.

2. The electronic device of claim 1, wherein at least one of the plurality of conductive members is linear or curved.

3. The electronic device of claim 1, wherein the plurality of conductive members are bound as a single body by using a conductive band.

4. The electronic device of claim 1, wherein the plurality of conductive members protrude at peripheries of the plurality of cell parts, respectively.

5. The electronic device of claim 1, wherein among the plurality of conductive members, at least one conductive member has a shape that is bent one or more times.

6. The electronic device of claim 1, wherein each of the plurality of cell parts has a rectangular shape when viewed from one surface of the battery.

7. The electronic device of claim 1, wherein the plurality of cell parts are disposed to be folded, rolled, or stacked with each other.

8. The electronic device of claim 1, wherein the plurality of conductive members are formed to have different lengths and different widths.

9. The electronic device of claim 1, further comprising:
a printed circuit board in the space,
wherein the plurality of conductive members are electrically connected to the printed circuit board.

10. The electronic device of claim 1, wherein the plurality of conductive members define positive electrode tabs or negative electrode tabs of the battery cell.

11. An electronic device comprising:
a housing comprising:
a first plate;
a second plate facing an opposite side of the first plate; and
a side member surrounding a space between the first plate and the second plate, and connected to the second plate or integrally formed with the second plate;
a display disposed in the space and visually exposed through at least a portion of the first plate; and
a battery disposed in the space to be parallel to the first plate, the battery comprising:
a battery cell comprising a plurality of cell parts disposed such that at least portions of the plurality of cell parts overlap each other when the first plate is viewed from the top; and
a plurality of electrode tabs protruding to the outside from at least two cell parts, among the plurality of cell parts, and wherein each of the plurality of electrode tabs is same electrode, wherein one or more electrode tabs, among the plurality of electrode tabs protruding from the at least two cell parts, do not overlap each other when the first plate is viewed from the top, wherein, the plurality of electrode tabs comprises:

a first electrode tab having a first width; and a plurality of second electrode tabs spaced apart from each other and spaced apart from the first electrode tab, and having a second width shorter than the first width, respectively and wherein in a state of unfolding, the first electrode tab is not overlapped with the plurality of second electrode tabs, and each one of the plurality of second electrode tabs is not overlapped with each other when viewed from the top of one surface of the battery, and wherein in a state of folding the each one of the plurality of second electrode tabs is not overlapped with each other and is overlapped with the first electrode tab when viewed from the top of the surface of the battery.

12. The electronic device of claim 11, wherein the one or more electrode tabs are disposed in parallel to each other while not overlapping each other.

13. The electronic device of claim 12, wherein the one or more electrode tabs, among the plurality of electrode tabs, comprise one or more bending parts.

14. The electronic device of claim 11, wherein the plurality of electrode tabs comprise positive electrode tabs or negative electrode tabs.

15. The electronic device of claim 11, wherein the plurality of electrode tabs are bound as a single body and joined to each other by a conductive structure, and the conductive structure comprises a conductive band.

* * * * *